(12) United States Patent
Roussev et al.

(10) Patent No.: US 12,345,629 B2
(45) Date of Patent: Jul. 1, 2025

(54) ENHANCED EVANESCENT PRISM COUPLING SYSTEMS AND METHODS FOR CHARACTERIZING STRESS IN CHEMICALLY STRENGTHENED CURVED PARTS

(71) Applicant: CORNING INCORPORATED, Corning, NY (US)

(72) Inventors: Rostislav Vatchev Roussev, Painted Post, NY (US); Nathaniel David Wetmore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 274 days.

(21) Appl. No.: 18/070,022

(22) Filed: Nov. 28, 2022

(65) Prior Publication Data
US 2023/0168186 A1    Jun. 1, 2023

Related U.S. Application Data

(60) Provisional application No. 63/283,594, filed on Nov. 29, 2021.

(51) Int. Cl.
| | |
|---|---|
| *G01N 21/31* | (2006.01) |
| *G01N 21/25* | (2006.01) |
| *G01N 21/27* | (2006.01) |

(52) U.S. Cl.
CPC ........... *G01N 21/31* (2013.01); *G01N 21/255* (2013.01); *G01N 21/274* (2013.01); *G01N 2201/0634* (2013.01); *G01N 2201/127* (2013.01)

(58) Field of Classification Search
CPC ........ G01N 21/23; G01N 21/31; G01N 21/43; G01N 21/255; G01N 21/274;
(Continued)

(56) References Cited

U.S. PATENT DOCUMENTS

| | | |
|---|---|---|
| 9,696,207 B2 | 7/2017 | Roussev et al. |
| 10,156,488 B2 | 12/2018 | Liu et al. |

(Continued)

FOREIGN PATENT DOCUMENTS

| | | |
|---|---|---|
| JP | H11-281501 A | 10/1999 |
| WO | 2016196748 A1 | 12/2016 |

OTHER PUBLICATIONS

International Search Report dated Apr. 4, 2023, in counterpart application No. PCT/US2022/051078, 5 pages.

(Continued)

*Primary Examiner* — John H Le
(74) *Attorney, Agent, or Firm* — Payal Patel

(57) ABSTRACT

Methods and apparatus for obtaining a corrected digital mode spectrum for a chemically strengthened (CS) substrate having a curved surface are disclosed. The methods include digitally capturing transverse magnetic (TM) and transverse electric (TE) mode spectra of the CS substrate to form a digital mode spectrum image using an evanescent prism coupling system having a system calibration for measuring flat CS substrates. The method further includes establishing a calibration correction based on the difference in the digitally captured TM and TE mode spectra as compared to a reference TM and TE mode spectra for a reference CS substrate. The calibration correction is applied to the digital mode spectrum image to form the corrected digital mode spectrum image, which can be processed using the system calibration for measuring flat CS substrates to determine a refractive index profile and stress characteristics for the curved CS substrate.

20 Claims, 20 Drawing Sheets

(58) Field of Classification Search
CPC ..... G01N 2021/127; G01N 2021/0634; G01N 2021/4166
USPC .......................................................... 702/85
See application file for complete search history.

(56) References Cited

U.S. PATENT DOCUMENTS

| | | | |
|---|---|---|---|
| 10,495,530 | B2 | 12/2019 | Liu et al. |
| 11,169,037 | B2* | 11/2021 | Andrews ................ G01N 21/23 |
| 2015/0308897 | A1 | 10/2015 | Roussev et al. |
| 2018/0274997 | A1 | 9/2018 | Shang et al. |
| 2021/0157038 | A1* | 5/2021 | Andrews ................ G01N 21/41 |

OTHER PUBLICATIONS

Written Opinion of the International Searching Authority dated Apr. 4, 2023, in counterpart application No. PCT/US2022/051078, 7 pages.

\* cited by examiner

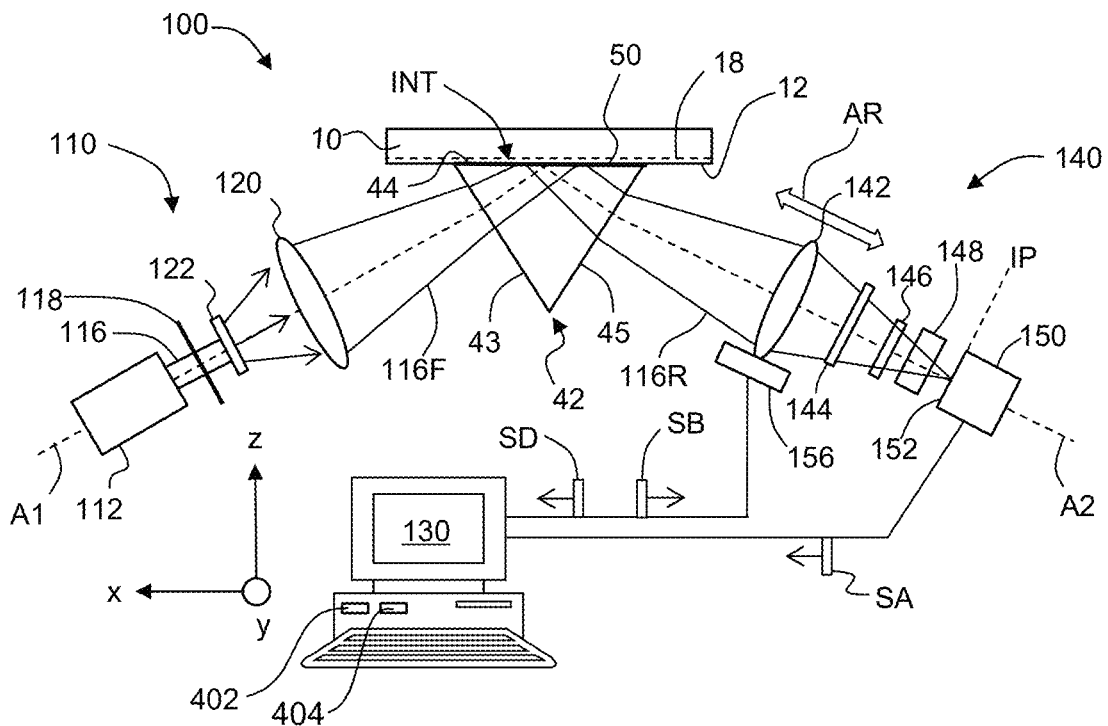
FIG. 3A
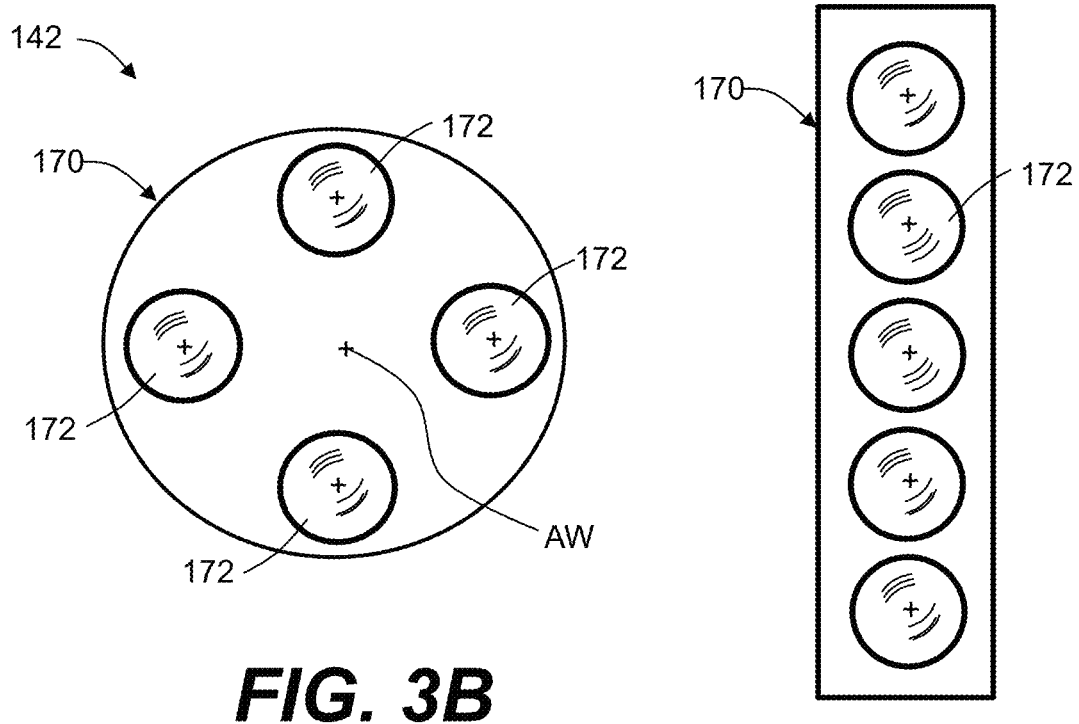
FIG. 3B
FIG. 3C

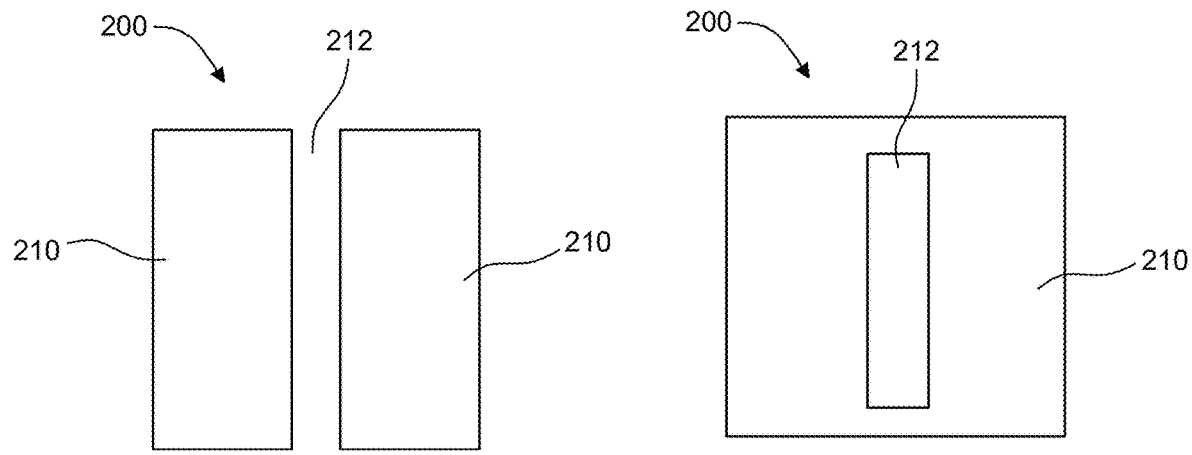
FIG. 4B  FIG. 4C
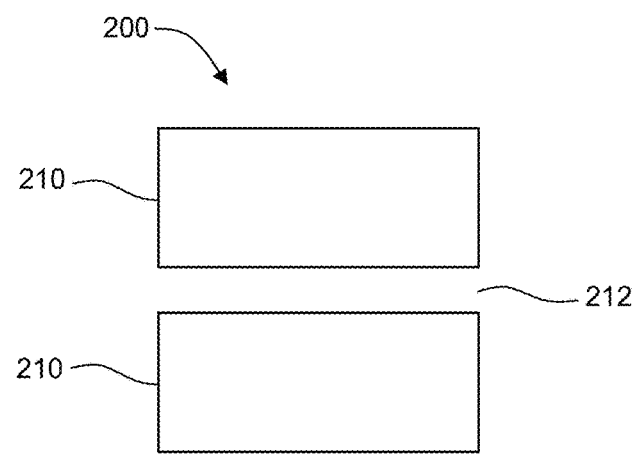
FIG. 4D

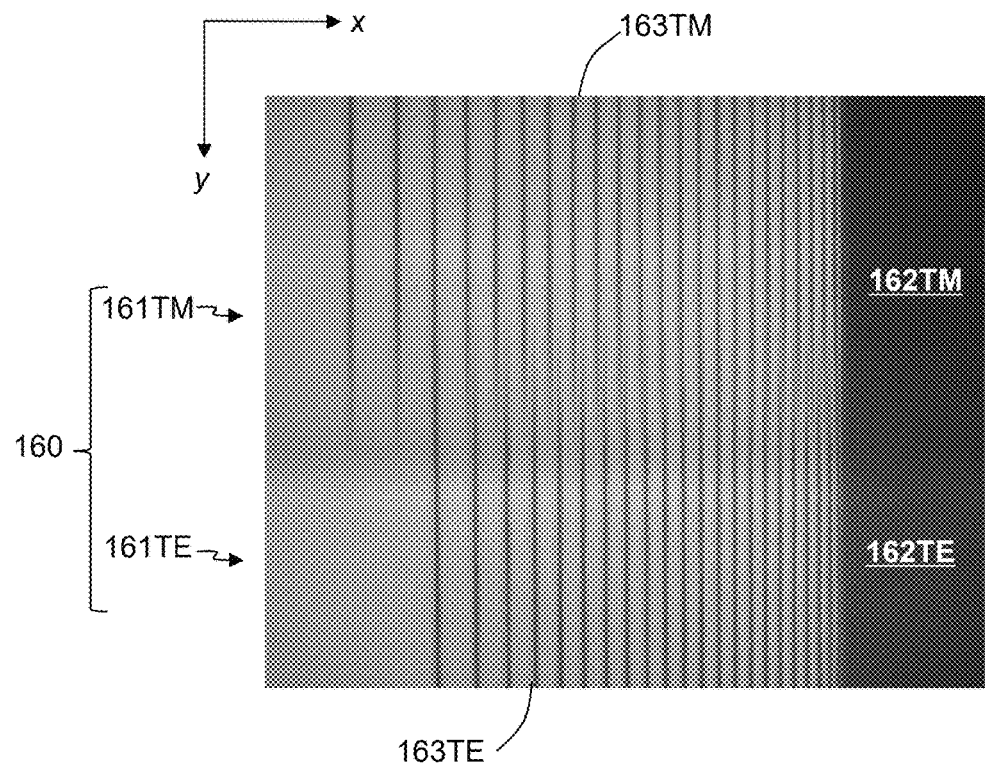
FIG. 11
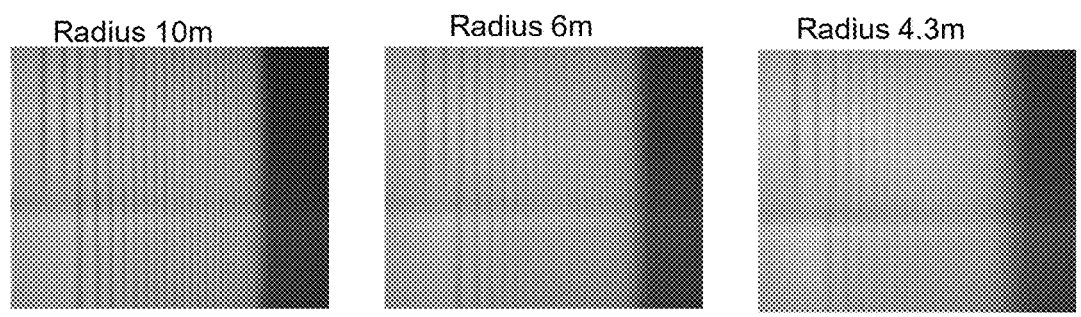
FIG. 12A  FIG. 12B  FIG. 12C

Spectra at position 1 (+3.5mm)
Radius 10m
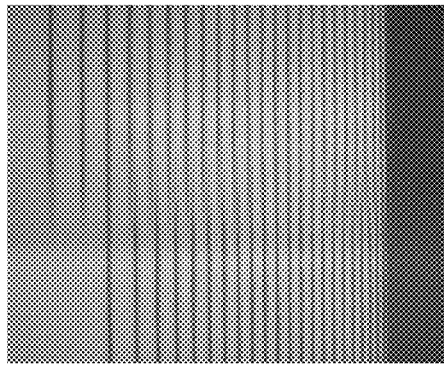
Radius 6m
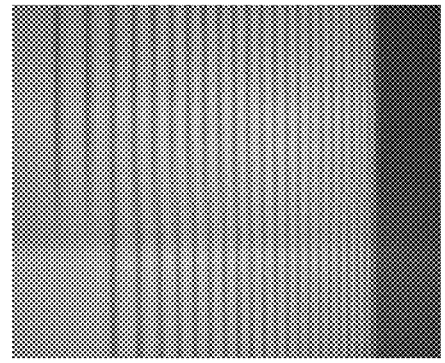
FIG. 13A
FIG. 13B
Spectra at position 2 (+5.8mm)
Radius 6m
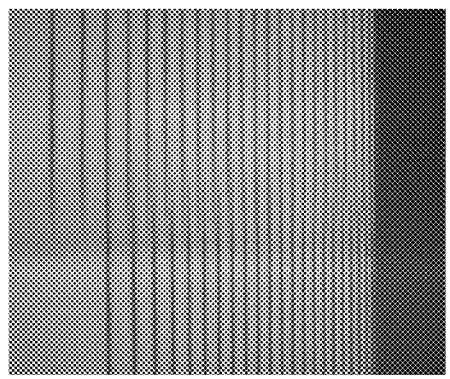
Radius 4.3m
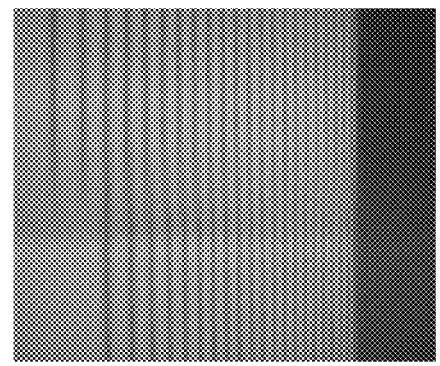
FIG. 14A
FIG. 14B

ENHANCED EVANESCENT PRISM COUPLING SYSTEMS AND METHODS FOR CHARACTERIZING STRESS IN CHEMICALLY STRENGTHENED CURVED PARTS

CLAIM OF PRIORITY

This application claims the benefit of priority under 35 U.S.C. § 119 of U.S. Provisional Application Ser. No. 63/283,594 filed on Nov. 29, 2021, the entirety of which is incorporated by reference herein.

FIELD

The present disclosure relates to measuring stress in parts, and in particular relates to evanescent prism-coupling systems and methods for characterizing stress in chemically strengthened curved parts.

BACKGROUND

Chemically strengthened glass and glass-ceramic parts have become important for a variety of applications, including resilient, shatter-resistant and scratch-resistant, touch-enabled, protective cover windows for smart phones and tablets. These glass parts and glass-ceramic parts are thinner and lighter than thermally tempered glass yet tougher due to the high surface compression achievable through an ion-exchange process.

The quick adoption, continuous improvement and dramatic market growth of such parts were boosted by the availability of quick nondestructive techniques for measuring the main stress characteristics of the parts, such as the surface compressive stress (CS), the knee stress and depth of layer (DOL). Such measurements can be made on flat parts using a commercially available high-resolution evanescent prism coupling system, such as the FSM-6000LE made by Orihara Industrial Co., Ltd and sold by Luceo, both of Japan. A stress characteristic, the center tension (CT), may be inferred by invoking a force balance requirement between the compressive and tensile forces of the given part.

A prism coupling system captures a mode spectrum of transverse-electric (TE) and transverse-magnetic (TM) optical propagation modes of a near-surface waveguide (NSWG) defined by the ion-exchanged region. The stress characteristics are extracted from the difference between the TM and TE mode spectra by using the stress-optic coefficient (SOC). Due to the small SOC, the stress-induced birefringence (difference between TM and TE refractive index) represents a small difference between two much larger index numbers. Consequently, the magnitude and shape of the recovered stress profile are strongly affected by small errors in the recovered TE and TM spectra. To minimize such errors, high-resolution capture of the TE and TM mode spectra is necessary, and this is not always possible with a standard configuration of commercially available evanescent prism coupling systems. This is particularly true with curved parts, which present unique measurement challenges.

SUMMARY

The mode spectrum (i.e., the TE and TM mode spectra) of a curved part is not properly imaged and captured using existing (conventional) evanescent prism coupling systems designed to measure flat parts. When a curved part is in contact with the coupling prism of a conventional evanescent prism coupling system, the TE and TM mode spectra can be blurred and distorted. This makes automatically identifying the effective indices of the guided optical modes problematic, which in turn reduces the accuracy of the stress calculations used to characterize the stress properties of the part.

The systems and methods disclosed herein result in improved systems and methods as compared to the prior art. Prior art evanescent prism coupling systems cannot accurately measure refractive index or stress-related characteristics of a curved CS substrate even if the focus is changed. This is because prior art systems have no way of correcting the distortions of the captured mode spectrum images due to the curved surface of the CS substrate. Without such correction, the measured value of the stress-related characteristic will be inaccurate to the point of not being useful.

According to aspect (1), a method of obtaining a corrected digital mode spectrum for a chemically strengthened (CS) substrate having a curved surface and an adjacent near-surface waveguide is provided. The method comprises: digitally capturing transverse magnetic (TM) and transverse electric (TE) mode spectra of the CS substrate using an evanescent prism coupling system to couple measurement light into and out of the near-surface waveguide to form a digital mode spectrum image, the evanescent prism coupling system having a system calibration for measuring flat CS substrates; establishing a calibration correction representative of a difference in the digitally captured TM and TE mode spectra as compared to a reference TM and TE mode spectra for a reference CS substrate; and applying the calibration correction to the digital mode spectrum image to form the corrected digital mode spectrum image that can be processed using the system calibration for measuring flat CS substrates.

According to aspect (2), the method of aspect (1) is provided, further comprising: processing the corrected digital mode spectrum using the system calibration to determine at least one of: a) a refractive index profile; and b) one or more stress-related characteristics of the curved CS substrate being measured.

According to aspect (3), the method of any of aspect (1) to the preceding aspect is provided, wherein the reference CS substrate is flat.

According to aspect (4), the method of any of aspect (1) to the preceding aspect is provided, wherein the TM and TE mode spectra respectively include TM and TE mode lines and mode-line spacings, the reference TM and TE mode spectra respectively include reference TM and TE mode lines and reference mode-line spacings, and wherein the establishing of the calibration correction comprises establishing a relationship between the mode-line spacings of the digital mode spectrum image to the reference mode-line spacings of the reference CS substrate.

According to aspect (5), the method of any of aspect (1) to the preceding aspect is provided, wherein the system calibration includes a focus and further comprising forming the digital mode spectrum image by changing the focus so that the digital mode spectrum image has either a maximum contrast or a maximum sharpness.

According to aspect (6), the method of aspect (5) is provided, wherein the calibration correction is a function of the change in the focus.

According to aspect (7), the method of any of aspect (1) to aspect (4) is provided, wherein the evanescent prism coupling system includes a detector system comprising a digital detector and a detector optical system arranged adjacent the digital detector and having an adjustable focus, and further comprising forming at the digital detector a focused digital mode spectrum image having either a maximum contrast or a maximum sharpness.

According to aspect (8), the method of aspect (7) is provided, wherein the adjustable focus is provided by a movable lens support structure that supports a discrete set of focusing lenses each having a different focal length.

According to aspect (9), the method of any of aspect (1) to the preceding aspect is provided, wherein the TM and TE mode spectra comprise respective TM and TE mode lines having a variable spacing $\Delta x$ and a corresponding effective index difference $\Delta n_{\mathit{eff}}$ wherein $\Delta x \propto \Delta n_{\mathit{eff}}$ for the system calibration, and wherein the establishing of the calibration correction comprises performing the operation $\Delta n_{\mathit{eff}} = K_d \cdot \Delta x$ where $K_d$ comprises a dynamic calibration parameter for the curved CS substrate.

According to aspect (10), the method of aspect (9) is provided, where $n_p$ is a refractive index of a coupling prism of the evanescent prism coupler, l is a first axial distance between a detector optical system and a coupling interface of the coupling prism and the CS substrate, L is a second axial distance between the detector optical system and a digital detector that digitally captures the TM and TE mode spectra, $K_f$ is a system calibration parameter for the system calibration for the reference CS substrate and wherein the dynamic calibration parameter $K_d$ is calculated as:

$$K_d = \frac{PQ}{n_p}\sqrt{n_p^2 - n_{\mathit{eff}}^2}$$

where P is given by $P=[K_f L]^{-1}$; and where Q is given by $$Q = \frac{2l\, n_p}{\gamma R\, \cos\alpha}$$

where $\gamma$ is a system calibration parameter for measuring curved CS substrates having a local radius of curvature R at the coupling interface and a comprises the incidence angle of a measurement light beam incident the coupling prism for the corresponding TE and TM mode lines.

According to aspect (11), the method of any of aspect (1) to the preceding aspect is provided, wherein the evanescent prism coupling system comprises an axis, a coupling prism interfaced with the curved surface of the CS substrate to define a coupling interface, a digital detector, and a detector optical system arranged between the prism and digital detector along the axis to define a first axial distance l between the detector optical system and the coupling interface and a second axial distance L between the detector optical system and the digital detector, and wherein a length ratio l/L<ε, wherein ε is a tolerance value and is in the range from 0.2 to 0.01.

According to aspect (12), an evanescent prism coupling system configured to determine at least one of a refractive index profile and at least one stress characteristic in a chemically strengthened (CS) substrate formed by an ion-exchange (IOX) process and having a curved surface and a near-surface index region (NSIR) is provided. The evanescent prism coupling system comprises: a light source system that forms a focused light beam that travels along a first axis; a coupling prism interfaced with the curved surface of the CS substrate to form a coupling interface that receives the focused light beam and forms a reflected light beam that travels along a second axis and that embodies a mode spectrum of the near-surface waveguide; a detector system arranged along the system axis and comprising in order from the coupling prism: a detector optical system; a polarizer having transverse magnetic (TM) and transverse electric (TE) sections; a digital detector; and wherein the detector optical system is located an axial distance l from the coupling interface and an axial distance L from the digital detector to define a length ratio $0.01 \leq l/L \leq 0.2$ to form a mode spectrum image at the digital detector.

According to aspect (13), the evanescent prism coupling system of aspect (12) is provided, wherein the NSIR comprises a near-surface waveguide region.

According to aspect (14), the evanescent prism coupling system of any of aspect (12) to the preceding aspect is provided, wherein the detector optical system has an adjustable focus to form the mode spectrum image at the digital detector to have a maximum amount of an image contrast or an image sharpness.

According to aspect (15), the evanescent prism coupling system of any of aspect (12) to the preceding aspect is provided, wherein the adjustable focus is provided by a movable lens support structure that supports a discrete set of focusing lenses each having a different focal length.

According to aspect (16), the evanescent prism coupling system of any of aspect (12) to the preceding aspect is provided, wherein the coupling prism has an input side and an output side and further comprising at least one light restrictor arranged adjacent at least one of the input side and the output side of the coupling prism.

According to aspect (17), a method of determining at least one of a refractive index profile and at least one stress characteristic of a curved chemically strengthened (CS) substrate using an evanescent prism coupling system having an adjustable focus is provided. The method comprises: a) calibrating the system by adjusting the adjustable focus to a first focus that forms an in-focus calibration mode spectrum image of a reference CS substrate to establish a calibrated system for measuring the reference CS substrate; b) using the calibrated system, forming an in-focus mode spectrum image for the curved CS substrate by adjusting the adjustable focus to a second focus due to a focus shift caused by using the curved CS substrate in the calibrated system for measuring the flat CS substrate; c) determining a raw value of at least one stress-related characteristic of the curved CS substrate based on the in-focus mode spectrum image for the curved CS substrate using a corresponding at least one calculation for the at least one stress-related characteristic for the flat CS substrate; and d) adjusting the raw value of the at least one stress-related characteristic to obtain a corrected value by multiplying the raw value by a correction factor based on the change in the adjustable focus from the first focus for the flat CS substrate to the second focus for the curved CS substrate.

According to aspect (18), the method of aspect (17) is provided, wherein the reference CS substrate comprises a flat CS substrate.

According to aspect (19), the method of any of aspect (17) to the preceding aspect is provided, wherein the change in the adjustable focus from the first focus to the second focus comprises changing an axial distance between a detector optical system and a digital detector.

According to aspect (20), the method of any of aspect (17) to the preceding aspect is provided, wherein a detector optical system has an amount of optical power and wherein changing the adjustable focus from the first focus to the second focus comprises changing the amount of optical power of the detector optical system.

According to aspect (21), the method of aspect (20) is provided, wherein the detector optical system comprises a liquid lens having a surface and wherein changing the amount of optical power comprises changing an amount of curvature of the surface of the liquid lens.

According to aspect (22), the method of any of aspect (17) to the preceding aspect is provided, wherein the correction factor comprises a dynamic correction factor $K_d$ such that:

$$K_d = \frac{K_f}{1 - \frac{1}{L_f K_f} \cos\alpha \left(l_1 + \frac{l_2}{n_p}\right) \frac{(L-f)}{\gamma f L}},$$

wherein: $K_f$=calibration factor for the calibrated $$\text{system} = \frac{1}{f \frac{d\beta_e}{dn_{\textit{eff}}}}$$

where f is the system focus and $$\frac{d\beta_e}{dn_{\textit{eff}}}$$

is the change in a ray angle $\beta_e$ an effective index $n_{\textit{eff}}$ for a light beam that forms the in-focus mode spectrum image for the flat CS substrate; $L_f$=axial distance from a detector optical system to a digital detector; and $$\cos\alpha = \frac{1}{n_p}\sqrt{n_p^2 - n_{\textit{eff}}^2},$$

where $n_p$ is a refractive index of a coupling prism used to couple a measurement light beam into and out of the curved CS substrate; $l_1$ is an axial distance between the detector optical system and an output surface of the coupling prism; and $l_2$ is the axial distance from the output surface of the an interface between a coupling surface of the coupling prism and a surface of the CS substrate.

According to aspect (23), the method of aspect (22) is provided, wherein the at least one stress-related characteristic comprises a surface compressive stress, the raw value comprises a surface compressive stress $CS^{(raw)}$ and wherein the corrected value of the surface compressive stress is given according to $$CS = \frac{K_d}{K_f} CS^{(raw)}.$$

According to aspect (24), the method of any of aspect (22) to the preceding aspect is provided, wherein the at least one stress-related characteristic comprises a knee stress CSk, the raw value comprises a raw knee stress $CSk^{(raw)}$ and wherein the corrected value of the knee stress is given according to $$CSk = \frac{K_d}{K_f} CSk^{(raw)}$$

According to aspect (25), the method of any of aspect (22) to the preceding aspect is provided, wherein the at least one stress-related characteristic comprises a depth of layer DOL, the raw value comprises a raw depth of layer $DOL^{(raw)}$ and wherein the corrected value of the depth of layer is given by $$DOL = \sqrt{\frac{K_f}{K_d}} DOL^{(raw)}.$$

According to aspect (26), an evanescent prism coupling system for determining at least one of a refractive index profile and at least one stress characteristic of a curved chemically strengthened (CS) substrate having a curved surface with a near-surface waveguide is provided. The evanescent prism coupling system comprises: a light source system that generates measurement light; a coupling prism having a coupling surface interfaced with the curved surface at a coupling surface to define a coupling interface having a local radius of curvature R to couple a portion of the measurement light into TM and TE guided modes of the near-surface waveguide and to couple a portion of the measurement light from the TM and TE guided modes as output light; a detector system comprising a detector optical system having an adjustable focus and configured to receive the output light and to form TM and TE mode spectra images at a digital detector arranged to receive and detect the TM and TE mode spectra images, and where the detector optical system has a first focus for measuring a flat CS substrate and wherein the adjustable focus is adjustable to a second focus for the curved CS substrate, wherein the second focus forms the TM and TE mode spectra images with either a maximum contrast or a maximum sharpness; controller operably connected to the digital detector and configured to process the detected TM and TE mode spectra of the curved CS substrate to determine the at least one stress characteristic of the curved CS substrate by: determining a raw value of at least one stress-related characteristic of the curved CS substrate based on an in-focus mode spectrum image for the curved CS substrate using a corresponding at least one calculation for the at least one stress-related characteristic for the flat CS substrate; and adjusting the raw value of the at least one stress-related characteristic to obtain a corrected value by multiplying the raw value by a correction factor based on the change in the adjustable focus from the first focus for the flat CS substrate to the second focus for the curved CS substrate.

According to aspect (27), the evanescent prism coupling system of aspect (26) is provided, wherein the adjustable focus of the detector optical system comprises the detector optical system being axially movable.

According to aspect (28), the evanescent prism coupling system of aspect (26) is provided, wherein the adjustable focus of the detector optical system comprises changing an amount of optical power of the detector optical system.

According to aspect (29), the evanescent prism coupling system of aspect (28) is provided, wherein the detector optical system comprises a liquid lens and the liquid lens is used to change the amount of optical power.

According to aspect (30), the evanescent prism coupling system of aspect (26) is provided, wherein the correction factor comprises a dynamic correction factor $K_d$ such that $$K_d = \frac{K_f}{1 - \frac{1}{L_f K_f} \cos\alpha \left(l_1 + \frac{l_2}{n_p}\right) \frac{(L-f)}{\gamma f L}},$$

wherein: $KH_f$=calibration factor for the calibrated $$\text{system} = \frac{1}{f \frac{d\beta_e}{dn_{eff}}}$$

where f is the detector optical system focus and $$\frac{d\beta_e}{dn_{eff}}$$

is the change in a ray angle $\beta_e$ with a change in the effective index $n_{eff}$ for the output light beam that forms an in-focus mode spectrum image for the flat CS substrate; $L_f$=axial distance from the detector optical system to the digital detector; and $$\cos\alpha = \frac{1}{n_p}\sqrt{n_p^2 - n_{eff}^2},$$

where $n_p$ is a refractive index of a coupling prism used to couple a measurement light beam into and out of the curved CS substrate; $l_1$ is an axial distance between the detector optical system and an output surface of the coupling prism; and $l_2$ is the axial distance from the output surface of the an interface between a coupling surface of the coupling prism and a surface of the CS substrate.

According to aspect (31), the evanescent prism coupling system of aspect (30) is provided, wherein the at least one stress-related characteristic comprises a surface compressive stress, the raw value comprises a surface compressive stress $CS^{(raw)}$ and wherein the corrected value of the surface compressive stress is given by $$CS = \frac{K_d}{K_f} CS^{(raw)}$$

According to aspect (32), the evanescent prism coupling system of any of aspect (30) to the preceding aspect is provided, wherein the at least one stress-related characteristic comprises a knee stress CSk, the raw value comprises a raw knee stress $CSk^{(raw)}$ and wherein the corrected value of the knee stress is given by $$CSk = \frac{K_d}{K_f} CSk^{(raw)}.$$

According to aspect (33), the evanescent prism coupling system of any of aspect (30) to the preceding aspect is provided, wherein the at least one stress-related characteristic comprises a depth of layer DOL, the raw value comprises a raw depth of layer $DOL^{(raw)}$ and wherein the corrected value of the depth of layer is given by $$DOL = \sqrt{\frac{K_f}{K_d}} DOL^{(raw)}.$$

According to aspect (34), a method of determining a first stress characteristic of a curved chemically strengthened (CS) substrate using an evanescent prism coupling system having an adjustable focus is provided. The method comprises: a) calibrating the system by adjusting the adjustable focus to a first focus that forms an in-focus calibration mode spectrum image of a flat CS substrate to establish a calibrated system for measuring the flat CS substrate, wherein the calibrated system comprises at least a first stress-related characteristic; b) using the calibrated system, forming an in-focus mode spectrum image for the curved CS substrate by adjusting the adjustable focus to a second focus to measure a focus shift caused by using the curved CS substrate in the calibrated system for measuring the flat CS substrate; c) modifying the first stress-related characteristic calculation for the flat CS substrate based on the measured focus shift to form a modified first stress-related characteristic calculation; and d) performing the modified first stress-related characteristic calculation to obtain a measurement of the first stress-related characteristic for the curved CS substrate.

According to aspect (35), the method of aspect (34) is provided, further comprising repeating acts a) through d) for a second stress-related characteristic.

According to aspect (36), the method of any of aspect (34) to the preceding aspect is provided, wherein the first stress-related characteristic comprises either a surface compressive stress CS(0), a knee stress CSk or a depth of layer DOL.

According to aspect (37), the method of aspect (34) is provided, wherein the first stress-related characteristic comprises a surface compressive stress CS(0) and wherein the modified first stress-related characteristic calculation has the form: $CS(0)=K_d \cdot B_{surf}/SOC$ where $B_{surf}$ is a surface birefringence measured using the in-focus calibration mode spectrum image for the flat CS substrate, SOC is a stress-optic coefficient and $K_d$ is a correction parameter based on the measured focus shift.

According to aspect (38), the method of aspect (34) is provided, wherein the first stress-related characteristic comprises a knee compressive stress CSk and wherein the modified first stress-related characteristic calculation has the form: $CSk=K_d \cdot B_{knee}/SOC$, where $B_{knee}$ is a knee stress birefringence as measured using the in-focus calibration mode spectrum image for the flat CS substrate, SOC is a stress-optic coefficient and $K_d$ is a correction parameter based on the measured focus shift.

According to aspect (39), an evanescent prism coupling system for determining a first stress characteristic of a curved chemically strengthened (CS) substrate having a curved surface with a near-surface waveguide is provided. The system comprises: a light source system that generates measurement light; a coupling prism having a coupling surface interfaced with the curved surface at a coupling surface to define a coupling interface having a local radius of curvature R to couple a portion of the measurement light into TM and TE guided modes of the near-surface waveguide and to couple a portion of the measurement light from the TM and TE guided modes as output light; a detector system comprising a detector optical system having an adjustable focus and configured to receive the output light and to form TM and TE mode spectra images at a digital detector arranged to receive and detect the TM and TE mode spectra images, and where the detector optical system has a first focus for measuring a flat CS substrate and wherein the adjustable focus is adjustable to a second focus for the curved CS substrate, wherein the second focus forms the TM and TE mode spectra images with maximum contrast; a controller operably connected to the digital detector and configured to process the detected TM and TE mode spectra of the curved CS substrate to determine the at least one stress characteristic of the curved CS substrate by: i) adjusting the adjustable focus to a second focus to measure a focus shift caused by using the curved CS substrate in the calibrated system for measuring the flat CS substrate; ii) modifying the first stress-related characteristic calculation for the flat CS substrate based on the measured focus shift to form a modified first stress-related characteristic calculation; and iii) performing the modified first stress-related characteristic calculation to obtain a measurement of the first stress-related characteristic for the curved CS substrate.

According to aspect (40), the system of aspect (39) is provided, wherein the first stress-related characteristic comprises either a surface compressive stress CS(0), a knee stress CSk or a depth of layer DOL.

According to aspect (41), the system of aspect (39) is provided, wherein the first stress-related characteristic comprises a surface compressive stress CS(0) and wherein the modified first stress-related characteristic calculation has the form: $CS(0)=K_d \cdot B_{surf}/SOC$ where $B_{surf}$ is a surface birefringence measured using the in-focus calibration mode spectrum image for the flat CS substrate, SOC is a stress-optic coefficient and $K_d$ is a correction parameter based on the measured focus shift.

According to aspect (42), the system of aspect (39) is provided, wherein the first stress-related characteristic comprises a knee compressive stress CSk and wherein the modified first stress-related characteristic calculation has the form: $CSk=K_d \cdot B_{knee}/SOC$ where $B_{knee}$ is a knee stress birefringence as measured using the in-focus calibration mode spectrum image for the flat CS substrate, SOC is a stress-optic coefficient and $K_d$ is a correction parameter based on the measured focus shift.

According to aspect (43), a method of obtaining a corrected mode spectrum image of a curved chemically strengthened (CS) substrate having a curved surface and an adjacent near-surface index region is provided. The method comprises: digitally capturing a mode spectrum image of the curved CS substrate using an evanescent prism coupling system operably engaged with the near surface index region, the evanescent prism coupling system having a flat CS substrate calibration to calculate the at least one stress characteristic; measuring an amount of distortion in the mode spectrum image of the curved CS substrate relative to a mode spectrum image of a reference flat CS substrate formed using a same ion-exchange (IOX) process as the curved CS substrate; and correcting the distortion in the mode spectrum image of the curved CS substrate to form a corrected mode spectrum image.

According to aspect (44), the method of aspect (43) is provided, wherein the near-surface index region comprises a near-surface waveguide region.

According to aspect (45), the method of aspect (44) is provided, further comprising: calculating at least one stress characteristic of the curved CS substrate using the corrected mode spectrum image and the flat CS substrate calibration to calculate the at least one stress characteristic.

According to aspect (46), the method of aspect (44) is provided, wherein the at least one stress characteristic comprises at least one of a surface compressive stress, a knee stress and a depth of layer.

According to aspect (47), the method of any of aspect (43) to (46) is provided, wherein the evanescent prism coupling system has an adjustable focus and has a first focus for the reference flat CS substrate, and wherein the act of digitally capturing a mode spectrum image of the curved CS substrate further comprises adjusting the adjustable focus to a second focus for the curved CS substrate.

According to aspect (48), the method of any of aspect (43) to (46) is provided, wherein the adjusting of the adjustable focus comprises changing an axial distance between the detector optical system and the digital detector.

According to aspect (49), the method of any of aspect (43) to (46) is provided, wherein the adjusting of the adjustable focus comprises adjusting an amount of optical power of the detector optical system.

According to aspect (50), the method of aspect (49) is provided, wherein the adjusting the amount of the optical power comprises adjusting an amount of surface curvature of a liquid lens.

According to aspect (51), a method of measuring at least one stress characteristic in a curved chemically strengthened (CS) substrate having a curved surface and an adjacent near-surface waveguide is provided. The method comprises: digitally capturing a mode spectrum image of the curved CS substrate using an evanescent prism coupling system operably engaged with the near surface waveguide, the evanescent prism coupling system having a flat CS substrate calibration to calculate the at least one stress characteristic; calculating the at least one stress characteristic of the curved CS substrate using the mode spectrum image of the curved CS substrate to arrive at a raw value for the at least one stress characteristic; measuring an amount of distortion in the mode spectrum image of the curved CS substrate relative to a mode spectrum image of a reference flat CS substrate formed using a same ion-exchange (IOX) process as the curved CS substrate; determining a correction factor based on the amount of distortion; and applying the correction factor to the raw value for the at least one stress characteristic to arrive at a corrected value for the at least one stress characteristic for the curved CS substrate.

According to aspect (52), the method of aspect (51) is provided, wherein the at least one stress characteristic comprises at least one of a surface compressive stress, a knee stress and a depth of layer.

According to aspect (53), the method of any of aspect (51) to the preceding aspect is provided, wherein the evanescent prism coupling system has an adjustable focus and has a first focus for the flat CS substrate calibration, and wherein the act of digitally capturing a mode spectrum image of the curved CS substrate further comprises adjusting the adjustable focus to a second focus for the curved CS substrate.

According to aspect (54), the method of any of aspect (51) to the preceding aspect is provided, wherein the determining of the correction factor is based in part on the difference between the first focus and the second focus.

According to aspect (55), the method of any of aspect (51) to aspect (54) is provided, wherein the adjusting of the adjustable focus comprises axially moving at least one of an optical system and a digital detector within the evanescent prism coupling system.

According to aspect (56), the method of any of aspect (51) to aspect (54) is provided, wherein the adjusting of the adjustable focus comprises adjusting an amount of optical power of a liquid lens element within the evanescent prism coupling system.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 3A is a schematic diagram of an example enhanced evanescent prism coupling system used to carry out the measurement methods disclosed herein for characterizing at least one stress-related property of a CS substrate;

FIG. 3B and FIG. 3C are front-on views of two example lens support structures, with FIG. 3B showing an example wheel configuration and FIG. 3C showing a linear configuration;

FIGS. 4B through 4D are front-on views of example light restrictors that can be used in the enhanced evanescent prism coupling system of FIG. 4A by blocking a portion of the light entering and/or leaving the coupling prism;

FIG. 11 is an actual mode spectrum image for a flat CS substrate, with the image being in-focus and thus having a maximum contrast associated with a first focus of the evanescent prism coupling system;

FIGS. 12A through 12C are actual mode spectrum images for three different curved CS substrates with R=10 m, R=6 m and R=4.3 m, respectively, with the images showing a decrease in contrast with a decrease in R, i.e., with an increase in the amount of curvature, with the images taken at the first focus of FIG. 11 for the flat CS substrate;

FIGS. 13A and 13B are actual mode spectrum images for the CS substrates with R=10 m and R=6 m but with the focus adjusted by increasing the distance between the lens and the camera sensor by +3.5 mm, which brings the mode spectrum image for R=10 m into best focus and which improves the contrast of the R=6 m image compared to the image taken at the first focus of FIG. 11 for the flat CS substrate;

FIGS. 14A and 14B are actual mode spectrum images for the CS substrates with R=6 m and R=4.3 m but with the focus adjusted by shifting the lens farther from the camera sensor by +5.8 mm, which brings the mode spectrum for R=6 m into best focus and which improves the contrast of the R=4.3 m image compared to the first-focus condition;

DETAILED DESCRIPTION

Figure 1A:
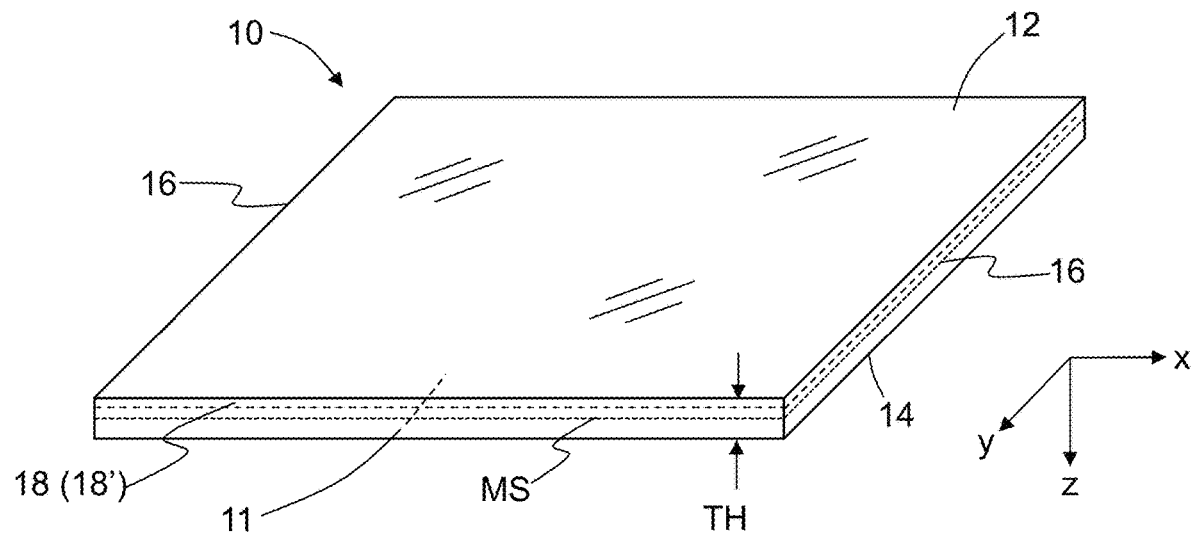
FIG. 1A and FIG. 1B are elevated views of an example CS substrate, with the CS substrate of FIG. 1A being flat and the CS substrate of FIG. 1B being curved, and with the CS substrates of FIGS. 1A and 1B otherwise having the same general structure.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are shown in some of the Figures for the sake of reference and are not intended to be limiting as to direction or orientation.

U.S. Pat. No. 10,495,530 entitled "Prism-coupling systems and methods for characterizing curved parts" issued on Dec. 3, 2019, and commonly assigned to Corning, Inc. is hereby incorporated by reference in its entirety.

The term "substrate" is also referred to herein as a part, sample, specimen, component, element, member and like terms as used herein that is subject to measurement using the enhanced evanescent prism coupling systems and methods disclosed herein to obtain one or more stress-related characteristics of the substrate. It is assumed that the substrate has a near-surface waveguide that enables use of an evanescent prism coupling system to obtain and process a guided mode spectrum (or angular spectrum of effective indices) defined by the near-surface optical waveguide.

The term "CS substrate" is short for "chemically strengthened substrate" as one example of a substrate formed using a chemical strengthening process such as an ion-exchange (IOX) process. In other parts of the discussion herein, the acronym CS stands for "compressive stress" and the use of the acronym CS to stand for either "chemically strengthened" and "compressive stress" will be apparent to one skilled in the art by the context of the discussion.

The term "curved" or "curvature" in relation to a surface of a given part or substrate being measured means a departure of that surface from flat, i.e., from a plane. The curvature is not restricted to a single dimension and surface curvatures in different dimensions need not be the same. The amount of curvature in a given dimension can be defined by a corresponding radius of curvature. The amounts of curvature considered herein are those that adversely affect at least one type of stress measurement as compared a perfectly flat version of the same part or substrate while still allowing for a prism coupling to be established between the coupling prism and the curved surface. In one aspect this includes the case of a substrate that is nominally flat in the measurement location by design, but happens to have a minor deviation from perfect flatness, as a result, for example, of ion-exchange induced warp associated with the complexity of the overall shape of the specimen, including presence of nominally non-flat regions away from the measurement location.

The curvature of the part or substrate can be due to warp. Aspects of the disclosure specifically address the unsolved problem of obtaining an accurate measurement when there is curvature in the plane containing the main optical path from the light source to the sensor, as described below. Unless otherwise stated, a given radius of curvature R or amount of curvature (1/R) is local to the measurement interface or coupling interface where the measurement is made.

The term IOX is short for ion-exchange or ion-exchanged.

Reference to two different parts, substrates, etc. being formed by the same or a same IOX process does not necessarily mean the two different parts are formed at the same time as part of the same batch. For example, a curved CS substrate and a reference CS substrate (which can be a flat substrate) can be formed using the same IOX process in separate batches at different times and still have the same or nearly identical refractive index profiles. Also, the term "same" is taken to mean within normal experimental limits and variations associated with IOX processes.

The terms "distorted" and "distortion" as used in reference to a mode spectrum image of a curved CS substrate means that the mode lines in the mode spectrum have different spacings as compared to the ideal spacings or to reference spacings that would be obtained if the CS substrate were flat. The distortion may be linear or non-linear.

The terms "mode spectrum" and "mode spectrum image" and like terms refer to an image of the angular reflectance spectrum, and can include cases where there are no guided modes and no mode lines.

The term "contrast" can be understood as the ratio $(I_{max}-I_{min})/(I_{max}+I_{min})$, where $I_{max}$ and $I_{min}$ are maximum and minimum intensity values respectively. The term "sharpness" can be understood as the inverse of the average full-width half maximum (FWHM) of a preferred set of fringes. These two parameters are strongly correlated, and either one can be used for automated control of focusing in the systems and methods disclosed herein.

Terms such as top, bottom, front, back, side, etc. are relative terms used for ease of discussion and are not intended to be limiting as to orientation and direction.

Chemically Strengthened (CS) Substrate

Figure 1B:
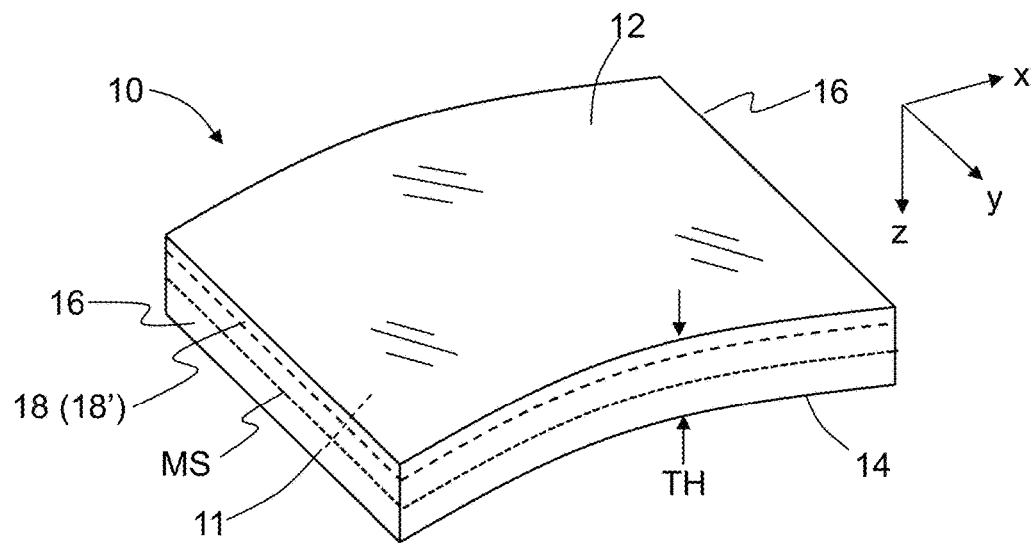

FIG. 1A and FIG. 1B are elevated views of example chemically strengthened (CS) substrates 10, with the CS substrate of FIG. 1A being flat and the CS substrate of FIG. 1B being the same CS substrate of FIG. 1A but curved in the x-direction in the local coordinate system shown. The CS substrate 10 of FIG. 1B can also have a curvature in the y-direction as well and is shown curved in one direction for ease of illustration. The CS substrate 10 has a body 11 that defines a first and second opposite surfaces 12 and 14, referred to as top and bottom surfaces for ease of discussion. The CS substrate 10 also has opposite edges 16 and a middle surface MS located midway between the top and bottom surfaces 12 and 14 and which is a planar surface in, for example, flat CS substrate of FIG. 1A. The "top" surface 12 is shown by way of example as the surface being measured and so can also be referred to as the measurement surface.

Example types of CS substrates 10 are glass-based and are used as protective covers for displays and/or housings for mobile devices such as smart phones, tablets, laptop computers, GPS devices, etc. Such CS substrates 10 tend to be thin and planar, such as shown in FIG. 1A, but can have a curvature such as shown in FIG. 1B (or curved in two directions) due to induced stress or because the substrate is formed to have a select curvature.

In some cases, the thickness TH can be in the range from 0.050 mm≤TH≤2 mm, such as 0.20 mm≤TH≤2 mm, 0.25 mm≤TH≤2 mm, 0.3 mm≤TH≤2 mm, or 0.3 mm≤ TH≤1 mm, and any and all sub-ranges formed between these endpoints.

In an example, the CS substrate 10 is made of glass and has undergone an ion-exchange (IOX) process whereby at least one type of ion has been exchanged through the one or both of the top and bottom surfaces 12 and 14 and into the body 11. The IOX process may define a near-surface waveguide (NSWG) 18 (shown at the top surface 12) that has a refractive index profile n(z) that may be different for s-polarized (transverse electric, TE) light than for p-polarized (transverse magnetic, TM) light, which is polarized parallel to its plane of incidence.

If the ion exchange does not result in a NSWG 18, as in some cases of chemical strengthening of Li-based glasses and glass ceramics using baths containing only or almost exclusively Na-based salts such as $NaNO_3$, the methods disclosed herein are still applicable with the slight modification that the targeted condition for maximum contrast should be associated with the sharpness of the intensity transition at the critical angle rather than with the sharpness of the fringes in the spectrum corresponding to guided optical modes, which are not available when there is no NSWG 18. In this case, the IOX process forms a near-surface index region (NSIR), denoted in FIGS. 1A and 1B as 18'. Note that the NSWG 18 can be thought of as an example type of NSIR 18' that supports guided modes.

Example Refractive Index Profiles

FIGS. 2A through 2E are plots of example refractive index profiles n(z) versus z (depth into the CS substrate) for example CS substrates based on different IOX processes. Both a TM profile $n(z)_{TM}$ and the TE profile $n(z)_{TE}$ are shown. The refractive index profiles n(z) may have two (IOX) regions, namely a first near-surface region R1 and a second deep region R2. There may also be a third region R3 deeper than the second deep region and it is referred to herein as the "bulk" region having the bulk refractive index $n_B$ of the body 11.

Figure 2A:
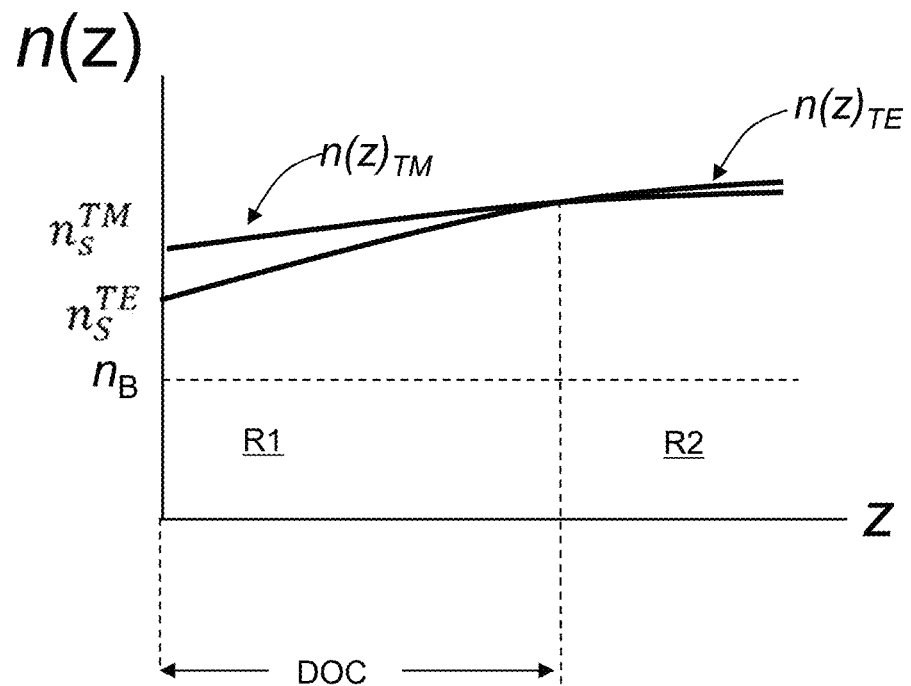
FIGS. 2A through 2E are plots of example refractive index profiles n(z) versus z (depth into the CS substrate) for example CS substrates based on different IOX processes.
Figure 2B:
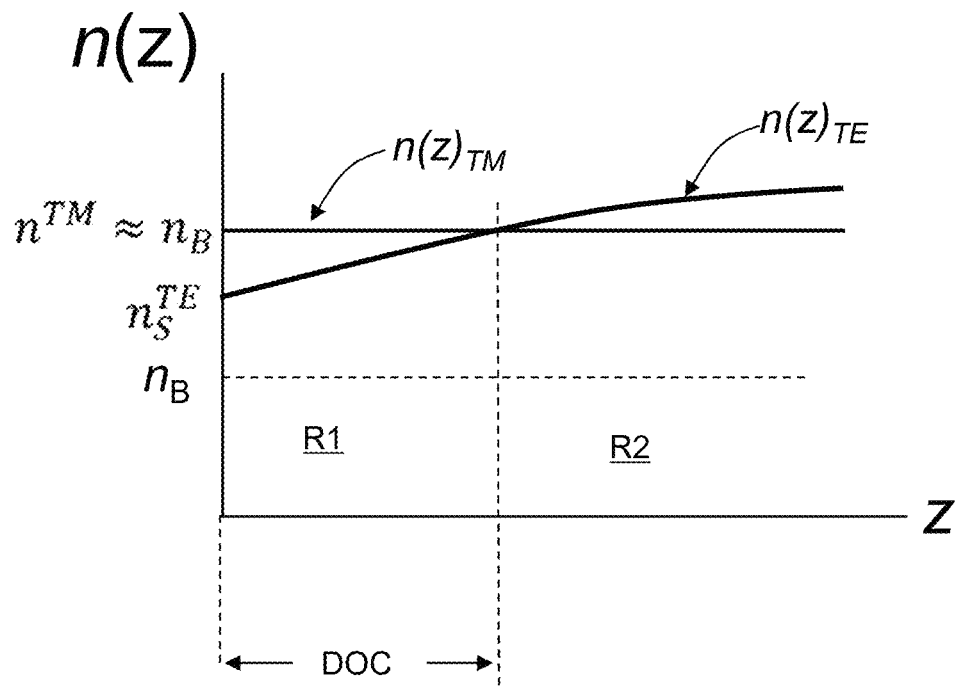
Figure 5A:
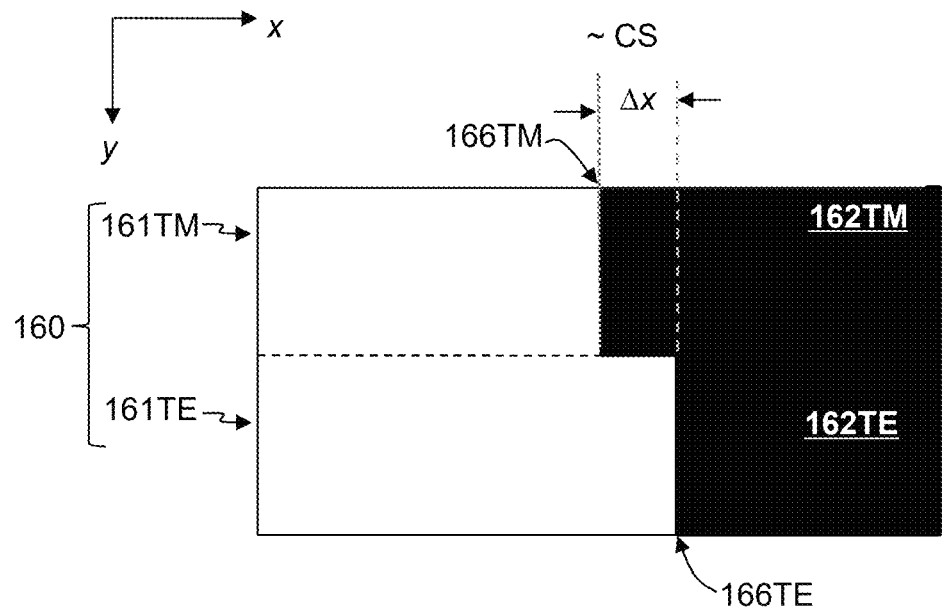
FIG. 5A is a schematic diagram of example idealized mode spectrum image corresponding to the example index profiles n(z) of FIGS. 2A and 2B.

FIG. 2A shows an example where the refractive index profile n(z) has a near-surface region R1 with a depressed refractive index compared to the deep region R2. In this instance, there is no NSWG 18 formed so that there will be no guided modes and no mode lines in the corresponding mode spectra, as discussed below in connection with FIG. 5A. The refractive index profile n(z) of FIG. 2A can be formed in some lithium-containing glasses using an Na+—Li+ IOX process. FIG. 2B is similar, but with the TM profile being nearly flat. The refractive index profile n(z) of FIG. 2B can be formed in various lithium-containing glasses using an Na+—Li+ IOX process. The index TM and TE index profiles of FIG. 2B results in qualitatively very similar prism-coupling reflectance spectrum image as the one illustrated schematically in FIG. 5A. The schematic spectrum image of FIG. 5A is applicable to both the index profiles of FIG. 2A and those of FIG. 2B.

Figure 2C:
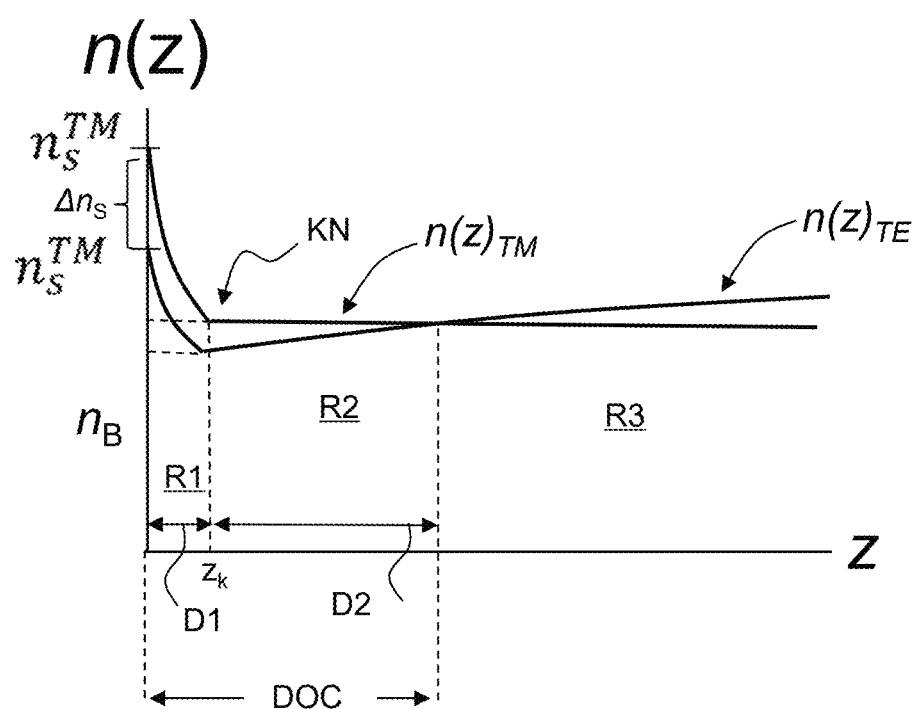
Figure 2D:
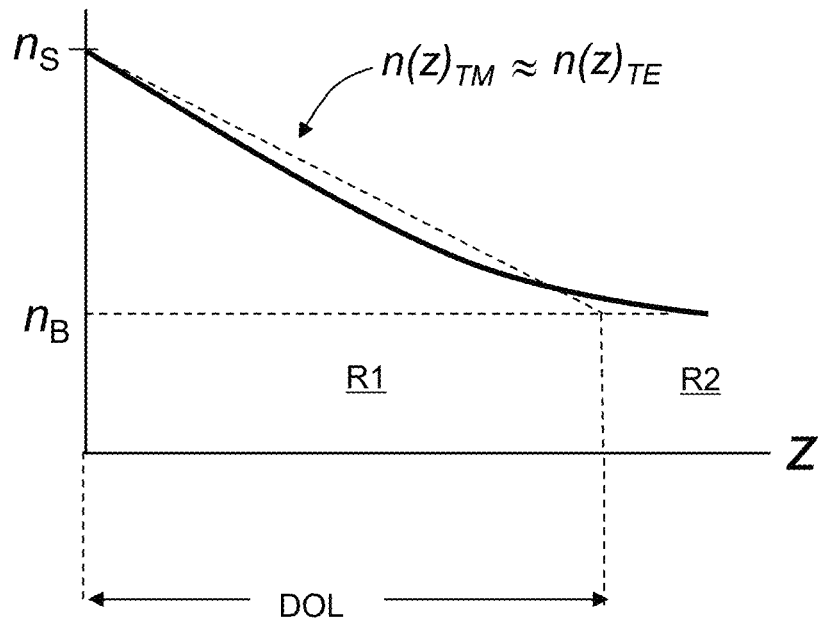
Figure 2E:
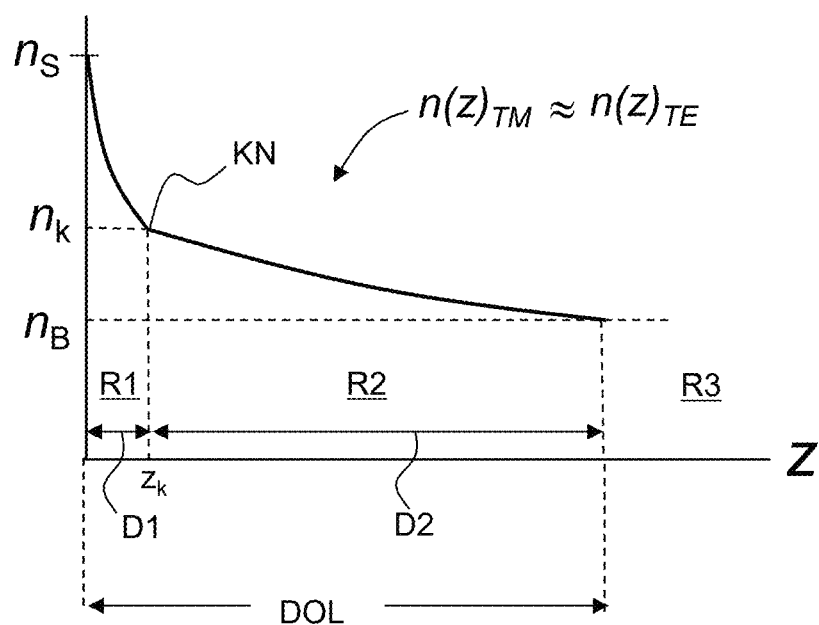

For the refractive index profile n(z) of FIGS. 2C through 2E, the near-surface region R1 is a region of substantially increased refractive index relative to the deeper region(s). In the case of FIGS. 2C and 2E, it is a "spike" region, i.e., it has a refractive index distribution starting with a surface refractive index $n_s=n(0)$ at the top surface 12 and rapidly decreasing with depth (z) to a value $n_k$ at a relatively shallow depth z=D1, which can be called the first "spike" depth D1. This results in the formation of the NSWG 18. In the case 2D said region R1 need not be a shallow spike, but may extend relatively deep. The deep region R2 has a slower decrease in the refractive index from $n_k$ down to a depth D2 for the profile of FIG. 2E, or may be similar to region R1 of FIG. 2A or 2B when the profile was obtained in a Li-based glass with the spike region R1 produced by potassium ion exchange into the glass and the next region R2 being produced by Na ion exchange with Li.

The depth of layer DOL measured traditionally by using the mode count of bound optical modes in a prism-coupling measurement is shown as D1 in FIGS. 2C and 2E, and as DOL in FIG. 2D. The depth of compression DOC is shown in FIG. 2C as the sum D1+D2 of the extents of the first and second region R1 and R2. The first and second regions R1 and R2 of the index and stress profiles of FIGS. 2C and 2E meet at (and thus define) a knee KN at a depth $z=z_k$, where (as noted above) the refractive index $n=n_k$ is referred to as the "knee index" and which is associated with a knee (compressive) stress $CS_k$.

Because of the two distinct refractive-index regions R1 and R2, the NSWG 18 formed by these regions (see FIGS. 1A, 1B) support guided modes that propagate substantially only in the uppermost spike region R1 while a small number of guided modes maybe said to travel in both regions R1 and R2, while still other guided modes travel substantially only in the deep region R2 in the case of the profile of FIG. 2E. Other refractive index profiles n(z) include more uniform changes in the refractive index profile n(z), such as shown in FIG. 2D. Some of the deep guided modes can extend slightly into the bulk region R3 for the case illustrated schematically in FIG. 2E. Note that in FIGS. 2D and 2E only one index profile n(z) is shown, as a representative of the shape of both the $n(z)_{TM}$ and $n(z)_{TE}$ profile, as in each of these 2 cases the shape of the TE profile is qualitatively the same as that of the TM profile. In all cases, the TM index profile and TE index profile cross at a zero-birefringence point, which occurs at the depth of compression (DOC) where the stress changes sign from compressive stress to tensile stress.

The refractive index profile n(z) of FIG. 2E is representative of a DIOX process carried out in Na-containing glass CS substrate 10 without Li, wherein potassium ions are exchanged for Na ions to a limited concentration but a large depth in the first step of ion exchange, and then again potassium ions are exchanged for Na ions to a much higher concentration but much smaller depth in a second ion-exchange step, said higher potassium concentration being responsible for the surface spike region R1.

The ion-exchange process that forms the ion-exchanged region in CS substrate 10 typically gives rise to an amount of birefringence B. This birefringence B can be used to calculate the stress (e.g., compressive stress CS) at (and near) top surface 12, and/or the compressive stress profile S(z), using known techniques. The stress profile S(z) is related to birefringence B via S(z)=B(z)/SOC, where SOC is the stress-optic coefficient and $B(z)=[N_{TM}(z)-N_{TE}(z)]$. The birefringence B can have different subscripts to indicate for example a surface birefringence $B_{surf}$, a knee birefringence $B_{knee}$, etc.

The Evanescent Prism Coupling System

Figure 4A:
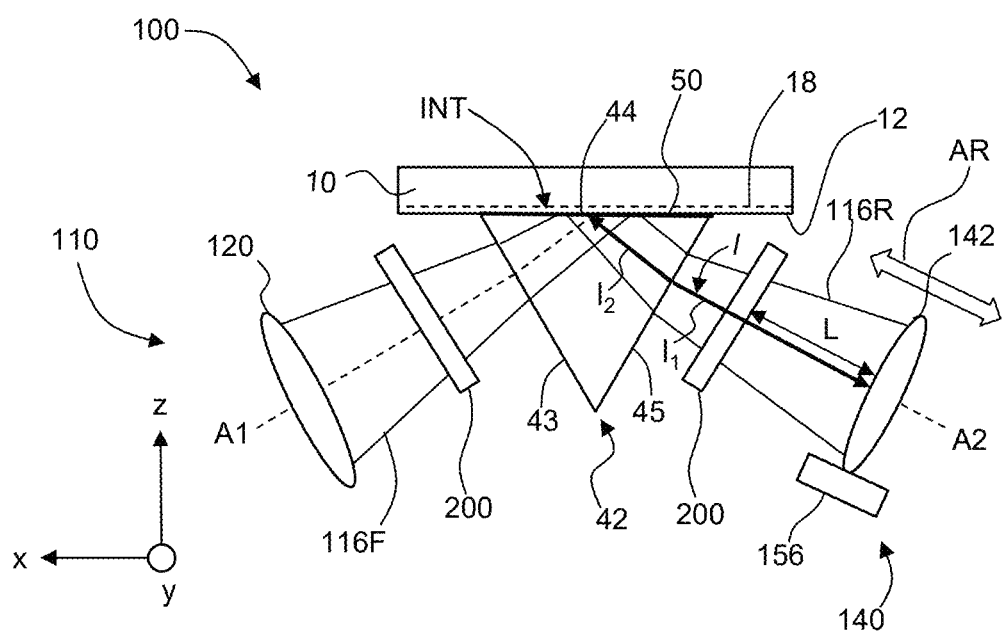
FIG. 4A is similar to FIG. 3A and illustrates an example configuration for the enhanced evanescent prism coupling system that employs either one or two beam restricting members on the light source side and/or the detector side of the system.

FIG. 3A is a schematic diagram of an example enhanced evanescent prism coupling system ("system") 100 while FIG. 4A is a close-up view of the central portion of the system 100 at the CS substrate. The enhanced evanescent prism coupling system 100 can be used to carry out the enhanced measurement methods disclosed herein. The system 100 has an enhanced or modified configuration that enables it to accurately measure a curved CS substrate 10 to obtain one or more stress characteristics such as a surface compressive stress S(0), a depth of layer DOL, a spike depth of layer $DOL_{sp}$, a knee stress $CS_k$ and a birefringence B for a curved CS substrate 10.

With reference to FIG. 3A and FIG. 4A, the system 100 includes a first system axis ("first axis") A1 along which resides a light source system 110 and also includes a second system axis ("second axis") A2 along which resides a detector system 140. The first and second axes A1 and A2 reside substantially in a common plane (e.g., x-z plane as shown).

The light source system 110 includes a light source 112 that generates a light beam 116 at a measurement wavelength $\lambda_A$, said light beam traveling along the first axis A1. The system 100 includes a coupling prism 42 having an index of refraction $n_p$, an input surface 43, an output surface 45 and a coupling surface 44 that is interfaced with the top surface 12 of the CS substrate 10 to form a coupling interface INT. In an example, an index-matching fluid 50 can be used between top surface 12 of the CS substrate and the coupling surface 44 to facilitate optical coupling of the measurement light into and out of the CS substrate and/or the NSWG 18, as described below.

The system 100 includes a system controller ("controller") 130, such as computer configured to carry out instructions embodied in a non-transient (non-transitory) computer readable medium, including calculating index-profile related and/or stress-related characteristics of the CS substrate based on measured coupling spectra and/or mode spectrum parameters as described below. In an example, the controller 130 includes a processor unit ("processor") 402 and a memory unit ("memory") 404. The controller can comprise a computer and can include any one of the know reading devices used in or with computers, for example, a floppy disk drive, a CD-ROM drive, a DVD drive, a magnetic optical disk (MOD) device (not shown), solid-state drive or any other digital device including a network-connecting device, such as an Ethernet device (not shown), for reading instructions and/or data from a computer-readable medium, such as a floppy disk, a CD-ROM, a DVD, a MOD, a flash drive or another digital source such as a network or the Internet. The controller 130 is configured to execute instructions stored in firmware and/or software (not shown), including signal-processing instructions for carrying out the stress-related measurement methods disclosed herein. In examples, the terms "controller," "computer," and "processor" are interchangeable.

The controller 130 is programmable to perform the functions described herein, including the operation of system 100 and the aforementioned signal processing of image signals to arrive at a measurement of at least one characteristic of the measured curved part, such as a surface stress, a stress profile, a compressive stress, a depth of layer, a refractive index profile, and a birefringence.

As used herein, the term "computer" is not limited to just those integrated circuits referred to in the art as computers but broadly refers to computers, processors, microcontrollers, microcomputers, programmable logic controllers, application-specific integrated circuits and other programmable circuits, and these terms are used interchangeably herein.

Software may implement or aid in the performance of the operations of system 100 disclosed herein, including the aforementioned signal processing in carrying out the methods disclosed herein. The software may be operably installed in controller 130 and in particular in processor 402 and memory 404. Software functionalities may involve programming, including executable code, and such functionalities may be used to implement the methods disclosed herein. Such software code is executable by the general-purpose computer, e.g., by the processor 402.

In operation, the code and possibly the associated data records are stored within a general-purpose computer platform, within processor 402 and/or in memory 404. At other times, however, the software may be stored at other locations and/or transported for loading into the appropriate general-purpose computer systems. The embodiments discussed herein involve one or more software products in the form of one or more modules of code carried by at least one machine-readable medium. Execution of such code by processor 402 of controller 130 enables the platform to implement the catalog and/or software downloading functions in essentially the manner performed in the embodiments discussed and illustrated herein.

The controller 130 and/or processor 402 may each employ a computer-readable medium or machine-readable medium (e.g., memory 404), which refers to any medium that participates in providing instructions to the processor for execution, including, for example, determining an amount of surface birefringence/stress or the stress profile S (x) of curved CS substrate 10. The memory 404 constitutes a computer-readable medium. Such a medium may take many forms, including but not limited to non-volatile media, volatile media and transmission media. Non-volatile media include, for example, optical or magnetic disks, such as any of the storage devices in any computer(s) operating as one of the server platforms discussed above. Volatile media include dynamic memory, such as the main memory of such a computer platform. Physical transmission media include coaxial cables, copper wire and fiber optics, including the wires that comprise a bus within a computer system.

Common forms of computer-readable media therefore include, for example, a floppy disk, a flexible disk, a hard disk, magnetic tape, flash drives and any other magnetic medium; a CD-ROM, a DVD and any other optical medium; less commonly used media such as punch cards, paper tape and any other physical medium with patterns of holes; a RAM, a PROM, an EPROM, a FLASH-EPROM and any other memory chip or cartridge; and a carrier wave transporting data or instructions, cables or links transporting such a carrier wave, or any other medium from which a computer can read programming code and/or data. Many of these forms of computer-readable media may be involved in carrying one or more sequences of one or more instructions to processor 402 for execution.

The system 100 may be a version of a commercial prism-coupling instrument, such as the FSM-6000LE prism-coupling instrument made and sold by Orihara Industrial Co., Ltd., of Tokyo, Japan, and modified as described here.

The light source system 110 also includes along the first optical axis A1: an optional polarizer 118, an optional light diffuser 122 that resides downstream of the light source 112, and an optional illumination system condensing lens 120 that resides downstream of the light diffuser. In an example, the light source 112 comprises a light-emitting diode (LED) or a laser diode.

The detector system 140 includes in order along the second system axis A2: a detector optical system 142, a band-pass filter 144 centered on the wavelength $\lambda_A$, an attenuator 146, a TM-TE polarizer 148 (which has side-by-side TM and TE sections, not shown) and a digital detector (e.g., a digital camera, image sensor, CCD array, etc.) 150 that has TM and TE sections (not shown) as defined by the TM-TE polarizer 148. The digital detector 150 has a detector surface 152, which in an example resides at an image plane IP of the detector optical system 142. In an example, the detector optical system 142 has amount of optical power and the amount of optical power is adjustable using one of the means for adjusting optical power known in the art and examples of which are discussed below.

The system 100 need not have the exact configuration as shown, e.g., the band-pass filter 144 may be placed on the source side, and the optional polarizer 118 may be omitted when using a split TM-TE polarizer 148. Or the optional polarizer 118 can be a rotating polarizer and the split TM-TE polarizer 148 omitted, with the detection done sequentially for TM and TE states in the same exact area of the digital detector. It is also noted that the order of the band-pass filter 144, the attenuator 146 and the detector optical system 142 can be changed and the order shown is by way of example. One skilled in the art will appreciate the various configurations and component placement options for the system 100 that can be used in practice.

The light beam 116 from the light source 112 is diffused by the light diffuser 122 and is focused by the light source system focusing lens 120 to form a focused light beam 116F. The term "focused" is used in a broad sense to mean that a lens may have been used to condense the beam to increase the efficiency of illumination of the target measurement area on the prism-specimen interface. The focused light beam 116F is incident upon the coupling prism 42 at the input surface 43 and travels to the coupling interface INT where a portion of the focused light beam is optically coupled into the substrate and/or the NSWG 18 and travels within the substrate and/or NSWG while a portion of the focused light beam is reflected from the coupling interface and forms a reflected light beam 116R. The reflected light beam exits the output surface 45 of the coupling prism 42 and travels along the second system axis A2 to the detector system 140. The reflected light beam 116R includes information about (i.e., embodies) the angular reflectance spectrum and/or the mode spectrum of the guided modes of the NSWG 18. The reflected light beam 116R is focused by the detector optical system 142 to form an image of the angular reflectance spectrum and the mode spectrum of the guided light at the digital detector 150. The detector optical system 142 is operably supported by a translation device 156 operably connected to the controller 130 and configured to axially translate (move) the focusing lens, as indicated by the movement arrow AR. The translation device 156 can send a device signal SD to the controller 130 representative of the axial position of the detector optical system 142, and the controller can send a control signal SB to the translation device to control the axial movement of the detector system focusing lens, as discussed in greater detail below.

In an example, the position of the detector optical system 142 is fixed and its focal length is adjustable. In one example, the adjustable focus is provided by using an adaptive lens such as a liquid lens whose focal length is changeable. In another example, the detector optical system 142 can be configured to have zoom capability.

The band-pass filter 144 enables the substantial suppression of the dispersion-induced broadening of the fringes in the spectrum corresponding to the coupling resonances of the guided optical modes, as well as the dispersion-induced broadening (smoothing) of the reflectance-intensity transition around the critical angle. In addition, when the band-pass filter 144 is placed along the second axis A2 close to the digital detector 150, it can provide a measurement convenience through assuring that broadband external light not part of the reflected light beam 116R is substantially blocked from reaching the digital detector 150.

In an example shown in FIG. 4A, the system 100 can include a first or first and second light restrictors 200 respectively arranged along the first and second axes A1 and A2 and adjacent the input and output surfaces 43 and 45 of the coupling prism. FIG. 4B is a front-on view of a first example of a light restrictor 200 that includes adjacent light-blocking members 210 that are spaced apart to define a narrow gap (slot) 212 through which the focused light beam 116F or the reflected light beam 116R can pass while the light-blocking members 210 block "stray" light and in particular light that would not focus as the focal plane. FIG. 4C is similar to FIG. 4B and shows an example light restrictor 200 comprising a single light-blocking member with the gap (slot) 212 formed therein. In examples, the gap (slot) 212 can be oriented in the measurement plane defined by first and second axes A1 and A2 (i.e., "vertical") or can also be lateral or horizontal, i.e., perpendicular to the measurement plane, as shown in the example light restrictor of FIG. 4D. When a horizontal light-blocking member 210 is used, it may only have a single element, such as the top element of the pair of light-blocking members 210 shown illustratively on FIG. 4D. The horizontal blocking member 210 can have multiple purposes. Besides restricting the beam to provide at the digital detector 150 only measurement light that has interacted with a small target portion of the measurement specimen, it also seeks improve fringe contrast by selecting a portion of the beam that carries the highest contrast.

The optional attenuator 146 helps assure that the detected reflected light beam 116R has the appropriate intensity distribution for efficient digital detection with substantial avoidance of saturating the detector pixels (not shown) when such saturation could be considered detrimental to measurement accuracy. The TM-TE polarizer 148 defines adjacent TM and TE sections for the digital detector so that TM and TE mode spectra can be simultaneously captured by adjacent sections of the digital detector 150. The TM and TE mode spectra are embodied in the first detector signal SA sent to the controller 130 for processing.

The system 100 is calibrated based on measuring a well-known (reference) calibration CS substrate 10, which may be a flat substrate, or a substrate with known curvature requiring a particular configuration of the system. This process is referred to as the system calibration and it means that the controller 130 and the instructions (software) supported therein carry out the calculations for determining the one or more stress-related characteristics based on the spatial characteristics of the mode spectrum image generated by the calibration substrate (such as a flat substrate) interface INT between the prism coupling surface 44 and a top surface 12 of the calibration CS substrate.

The system calibration establishes, among other things, a relationship between the spacings of effective indices of optical modes and the spacings of the corresponding positions of mode lines of the mode spectrum image as captured by the digital detector 150 and processed by the controller 130, as discussed below. In one embodiment, the relationship between the effective-index spacing and mode-line spacing is well approximated as a linear relationship, characterized by a calibration parameter (or calibration constant) K with units of measure amounting to refractive-index units (RIU) per unit length, such as RIU/mm, or simply $mm^{-1}$, since refractive index is dimensionless, so RIU represents simply the unit of dimensionless numbers. When calibration is performed for measurement of flat parts, using a flat calibration reference sample of known stress, the calibration parameter K can be labeled as $K_f$, standing for "calibration parameter for flat-sample measurements."

As noted above, additional configurations and modifications can be made to system 100, some of which are described in greater detail below in connection with carrying out the enhanced measurement methods disclosed herein.

Example Types of Mode Spectra

FIGS. 5A through 5D are schematic representation of idealized mode spectra 160 for CS substrates formed using different IOX processes and as captured by the digital detector 150. The mode spectrum of FIG. 5A corresponds to the example refractive index profiles n(z) of FIGS. 2A and 2B. The mode spectra of FIGS. 5B through 5D correspond to the example refractive index profiles n(z) of FIGS. 2C through 2E, respectively. Local (x,y) Cartesian coordinates are shown for reference. Each mode spectrum 160 includes TM and TE total-internal-reflection (TIR) sections 161TM and 161TE respectively associated with TM and TE guided modes, and non-TIR sections 162TM and 162TE respectively associated with TM and TE radiation modes and leaky modes.

FIG. 5A has no mode lines (meaning the NSWG 18 does not support guide modes) and so just shows transition regions ("transitions") 166TM and 166TE between the TIR sections 161TM, 161TE and the non-TIR sections 162TM, 162TE.

Figure 5B:
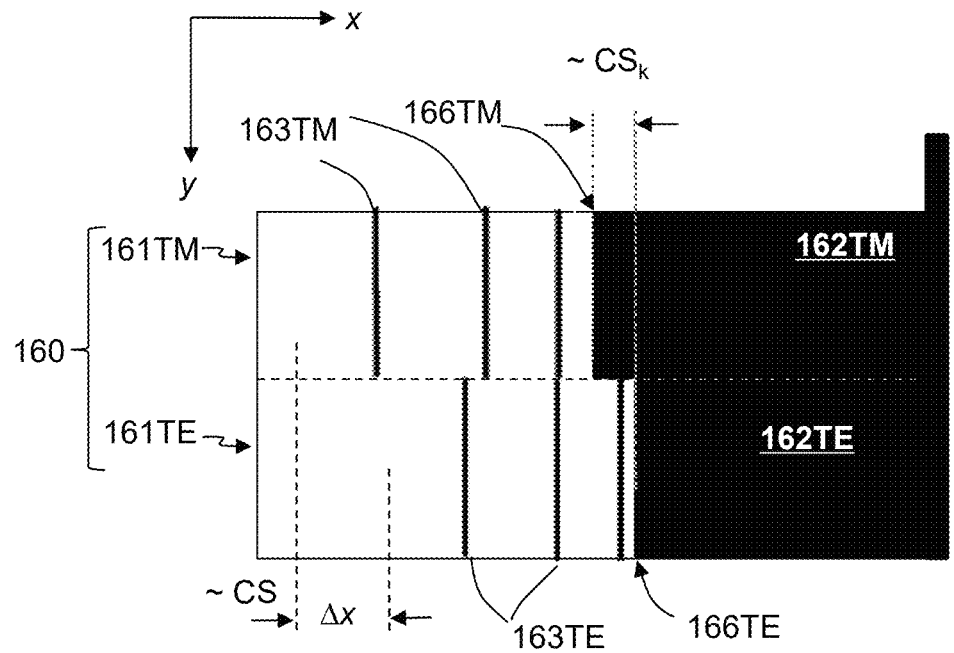
FIGS. 5B, 5C, and 5D are schematic diagrams of example idealized mode spectra (or mode spectra image) corresponding to the example refractive index profiles n(z) of FIGS. 2C, 2D, and 2E, respectively, as obtained by the evanescent prism coupling system of FIG. 3A and showing the mode lines (fringes) spaced apart in the x-direction of the local x-y coordinate system.
Figure 5C:
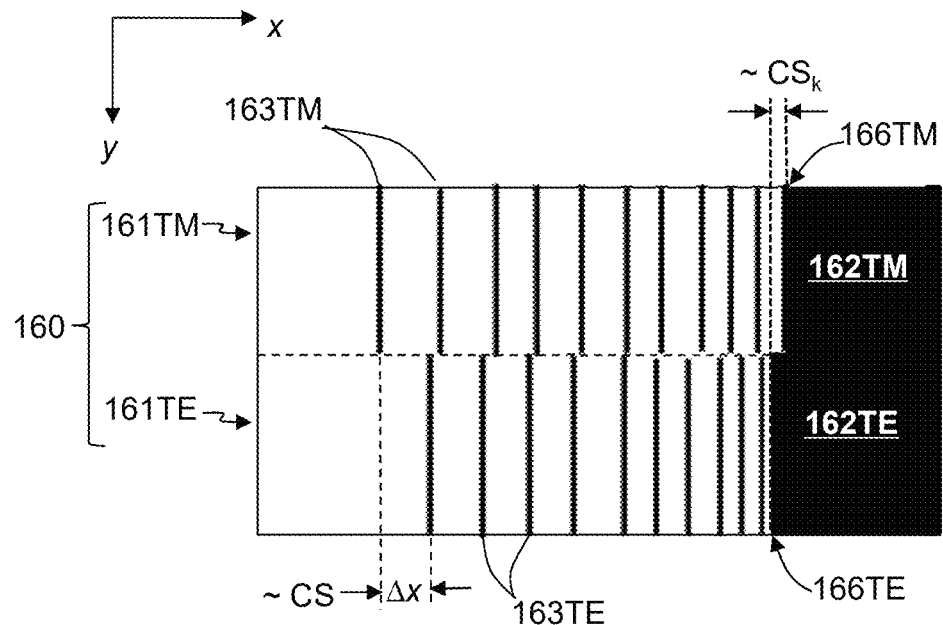
Figure 5D:
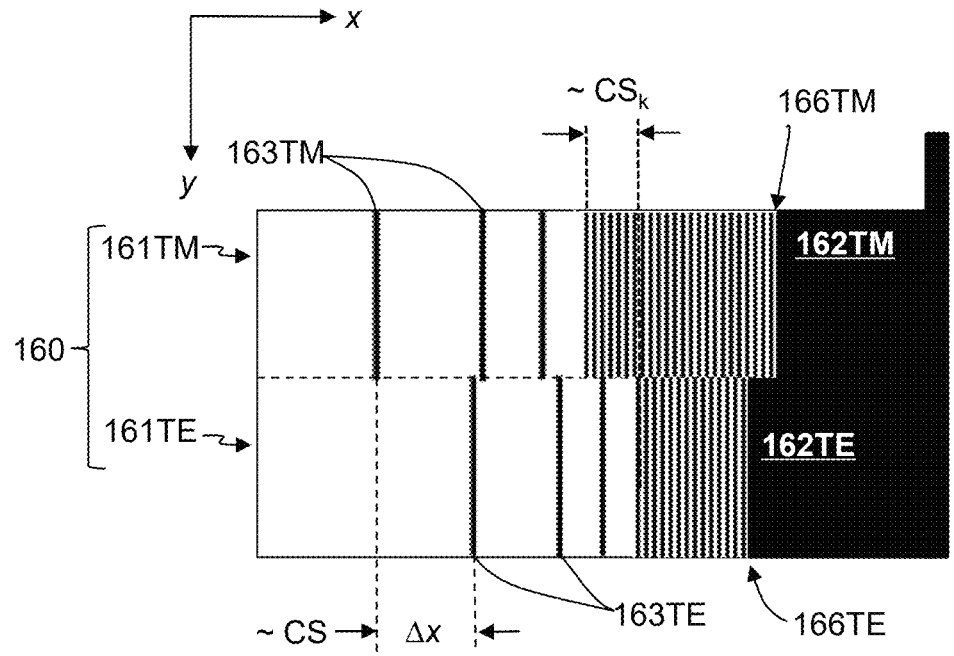

FIGS. 5B through 5D show examples where the TIR section 161TM includes one or more TM mode lines or TM "fringes" 163TM while the TIR section 161TE includes one or more TE mode lines or TE "fringes" 163TE. The TM and TE mode lines 163TM and 163TE are generally aligned in the y direction and are spaced apart in the x direction by differing amounts denoted Δx. The mode spectrum 160 is also referred to herein as the "mode spectrum image" when discussing the mode spectrum as captured and then processed by the digital detector 150. In another embodiment at least one of the TIR sections does not include mode lines, and the system may be operated without relying on mode lines, e.g., by relying on the location and sharpness of the reflectance-intensity transition between the bright TIR section and the dark non-TIR section.

The critical angle transitions 166TM and 166TE define a critical angle for the optical coupling into the CS substrate 10 for TM and TE polarized light, and are referred to as the critical angle transitions. The difference in locations of the start of the critical angle transitions 166TM and 166TE is proportional to the knee (compressive) stress $CS_k$ and this proportionality is indicated by "~$CS_k$". In the case of FIG. 5A, the profile has no "knee," and the difference in locations of the critical angle transitions 166TM and 166TE is then proportional to the surface (compressive) stress CS. Alternatively, the situation without a "knee" can be viewed as a situation where the knee stress $CS_k$ occurs at the surface and is therefore equal to the surface stress CS. Note that in FIG. 5D, the knee stress location ~$CS_k$ is associated with the transitions between sparse and dense mode lines.

The TM and TE mode lines 163TM and 163TE can either be bright lines or dark lines, depending on the configuration of system 100. In FIGS. 5B through 5D, the TM and TE mode lines 163TM and 163TE are shown as dark lines for ease of illustration. The mode spectra 160 of FIG. 5B and FIG. 5C represent an example of a single IOX process, with the NSWG 18 associated with FIG. 5B being substantially shallower than that of FIG. 5C. The mode spectrum 160 of FIG. 5B represents an example of ion exchange of a Li-containing glass in a molten salt mixture containing sodium and potassium ions, wherein the mode lines 163TM and 163TE are due to a NSWG produced by potassium ions. The mode spectrum 160 of FIG. 5B may result from both single-step and two-step IOX process performed on a Li-containing glass in different salt baths containing sodium and potassium ions. FIG. 5D shows an example of a double IOX (DIOX) process in a Na-based glass, and shows two transitions, one (the transition from sparse-fringe portion of the spectrum to the dense-fringe portion of the spectrum) corresponding to the index-profile and stress-profile knee point. The second transition, between the dense-fringe portion of the spectrum and the continuous low-reflectance portion 162TM/162TE of the spectrum, corresponds to the critical angle and may be referred to as the critical angle transitions 166TM and 166TE.

The stress characteristics for the measurement are calculated based on the difference in the x positions of the TM and TE mode lines 163TM and 163TE in the mode spectrum 160. The birefringence B as a function of depth is the difference between the TM and TE index distributions as a function of depth. We can also define birefringence of the effective indices of the TM and TE modes, wherein the effective indices are represented by the x positions of the mode lines in the captured spectrum on the sensor. The surface compressive stress S(0)=CS(0)=CS is computed by a surface birefringence B(0) obtained by extrapolated surface TM and TE indices found from extrapolation of the x distances (Δx) between the mode lines (effective indices), forming the ratio B(0)/SOC, where SOC is the stress optic coefficient.

$$CS(0) = \frac{B(0)}{SOC}$$

At least two TM and TE mode lines 163TM and 163TE are usually needed to accurately calculate the surface compressive stress S(0). Additional mode lines are usually needed to calculate a detailed compressive stress profile S(z). The depth of layer DOL is an approximate measure of stress penetration or ion penetration length into the body 11 of the CS substrate 10, and in the case of an IOX process, can also be calculated by the x-locations and number of mode lines 163TM and 163TE. The TM and TE mode line locations along the x axis are thus the most basic parameters for inferring stress-related characteristics of the CS substrate 10 and must be determined with the greatest accuracy possible to obtain the best (most accurate) measurement of stress-related properties of the CS substrate. In many cases, especially for the Li-glass mode spectra exemplified in FIGS. 5A and 5B, equally important is the accurate measurement of the transitions corresponding to the locations of the critical angle, as these are essential for finding $CS_k$ (or CS(0) when the profile is without a knee and there are no fringes). The calculations for determining the stress-related characteristics of the CS substrate 10 are carried out in the controller 130.

It is known in the art that for single IOX in Na-based glasses the DOL is usually approximated by a depth of an assumed linear index profile inferred from the fringe count and the surface index increase resulting from the ion exchange. Also, the measurement values of the compressive stress profile S(z), the compressive stress CS at the surface (also denoted CS(0) or S(0)), and the depth of layer DOL depend on an accurate account of the effective indices of the modes, which correspond to the x-locations of the mode lines. Hence, the x locations need to be measured precisely, and the effective indices need to be accurately calculated from the x locations.

Enhanced Measurement Methods Using Calibration Correction

When making measurements with system 100 for a CS substrate 10 having a curved top surface 12, the sharpest (i.e., narrowest-feature-breadth, where a feature is a mode spectrum line or a transition) or highest-contrast mode spectrum 160 does not occur at the same image plane IP of the detector optical system 142 as when measuring a flat CS substrate. It has also been observed by the present inventors that errors can occur if a standard flat-sample calibration for measuring a flat CS substrate 10 is used when the CS substrate 10 is curved or warped even when the mode spectrum 160 is brought into best focus.

A curved top surface 12 of the CS substrate 10 being measured in system 100 acts like a curved mirror that changes the angle (and thus direction) of the reflected light rays in the reflected light beam 116R. The change in angle/direction depends on where the light ray is incident upon the top surface 12 and also depends on the radius of curvature R of the CS substrate in the measurement plane (e.g., the plane of the drawing in FIG. 6B) and at the location of the reflected light ray. This gives rise to a distorted mode spectrum image as compared to the corresponding mode spectrum image for a flat surface even when the mode spectrum is refocused to have the greatest sharpness or contrast. The distorted mode spectrum image results in distorted or inaccurate measurements of the stress-related characteristics of the curved CS substrate being measured.

An aspect of the methods disclosed herein includes performing refocusing to obtain a maximum-contrast mode spectrum 160 and performing a recalibration process. The recalibration process may involve modifying the captured mode spectrum image for the curved CS substrate to maintain a proper mapping of the reflected light rays in the reflected light beam 116R to the image plane IP as if the CS substrate were flat even when the CS substrate 10 has a curvature. As discussed below, the recalibration (or calibration correction) can be described in terms of the either the angular path of the light rays in the reflected light beam 116R or in the spatial positions of the TM and TE mode lines 163TM and 163TE since as noted above the mode lines are a representation of the angular spectrum.

The recalibration process allows the system 100 to accurately measure stress-related characteristics of both flat and curved CS substrates 10, wherein measuring a flat substrate simply uses the original system calibration for flat parts (for example, $K_f$). This allows obtaining substantially the same measurements of stress-related characteristics of CS substrates 10 formed using the same IOX conditions even if the curvatures of the CS substrates are different.

In one embodiment, the recalibration process works by modifying the mode spectrum image data for a curved CS substrate 10 so that the controller 130 can process the captured and modified mode spectrum image data in the same manner as the mode spectrum image data for a flat CS substrate.

In another embodiment, the recalibration process works by modifying the results of measurements (of positions or distances, or directly of the calculated stress-profile parameters such as compressive stress and depth of layer) on the sharp-focus unmodified mode spectrum image without changing the mapping explicitly to recalculate a virtual image. Mathematically these two procedures lead to the same result.

The recalibration process can also be referred to as a dynamic calibration since it can be used on CS substrates 10 having different curvatures by calculating the correct calibration in real time by using real-time information about the focusing of the system 100. In one embodiment, a dynamic calibration parameter $K_d$ is calculated after taking into account a signal that accounts for the instantaneous focal power or focal length of the measurement system. As discussed in greater detail below, the calibration parameter may be obtained from a calibration relationship comprising the flat-calibration parameter $K_f$, the instantaneous focal power or focal length, the distance between the lens and the camera sensor, the distance between the prism and the lens, and a system-specific system-calibration constant labeled $\gamma$ herein.

In an example, the system calibration involves mapping between actual positions and effective index using a mapping formula, and the recalibration involves adjusting the mapping formula to obtain an accurate stress-related measurement. It is equivalent to say that the recalibration may represent the calculation of line positions in an imaginary image obtained from the distorted sharpest image by a recalibration equation. Then the line positions of the imaginary image are used to calculate effective indices and their spacings by using the original calibration. Also, the original calibration need not be performed on a flat part, and any part with well understood reference curvature, which may in fact be zero curvature (flat part) can serve as a reference part (or reference substrate).

Figure 6A:
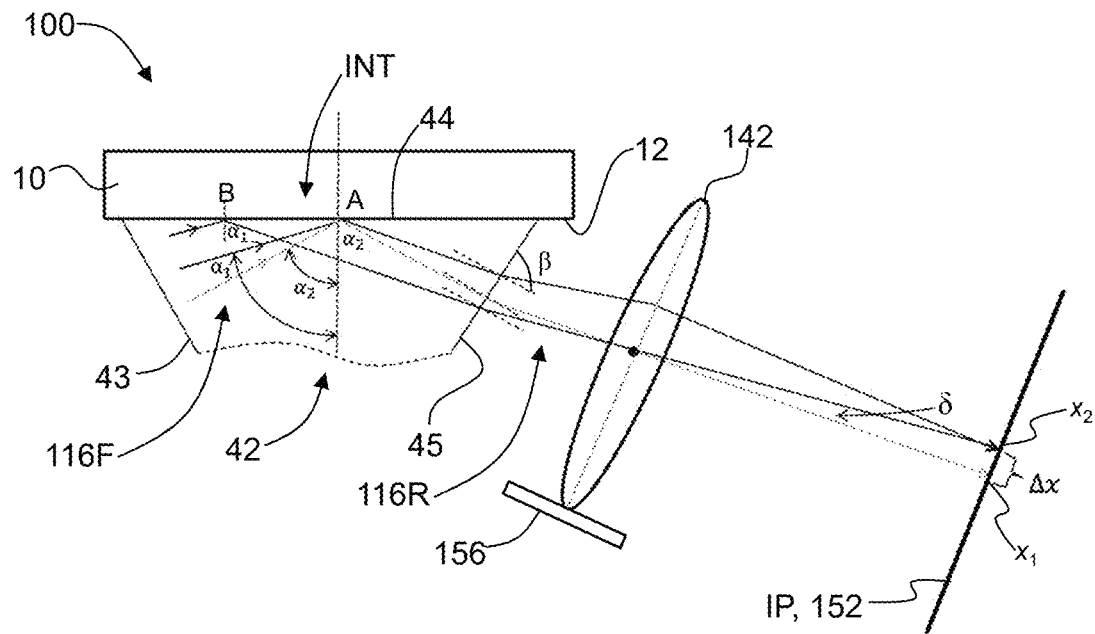
FIG. 6A is a close-up view of the detector system side of the evanescent prism coupling system of FIG. 3A illustrating the detection system configuration for a flat CS substrate.
Figure 6B:
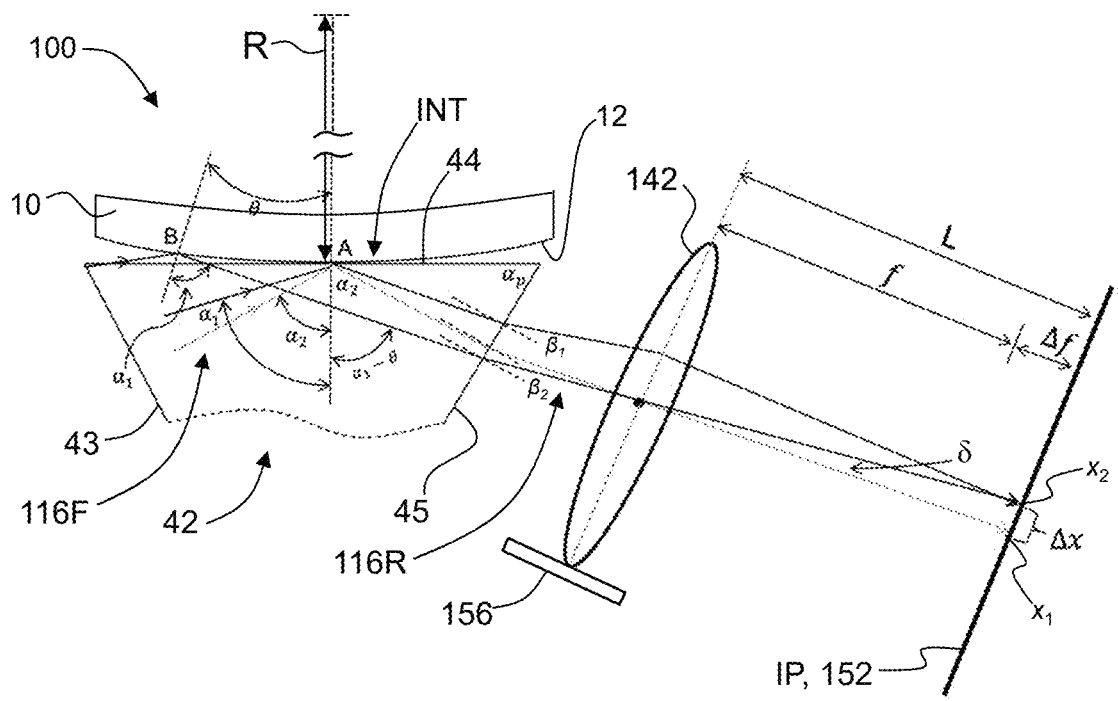
FIG. 6B is a close-up view of the detector system side of the evanescent prism coupling system of FIG. 3A illustrating the detection system configuration for a curved CS substrate.

FIG. 6A and FIG. 6B are close-up schematic diagrams of the detector system portion of the system 100 with a number of key optical parameters identified as described below. FIG. 6A shows the case for a flat CS substrate 10 while FIG. 6B shows the case for a curved CS substrate 10.

The enhanced measurement systems and methods disclosed herein involve reducing (including minimizing) the calibration error resulting from the measurement of a curved top surface 12 relative to measuring a CS substrate having a flat surface. With reference to FIG. 6B, this can include reducing (or minimizing) the ratio l/L ("length ratio") to be less than a tolerance value ε, where l is the effective axial distance between the coupling interface INT and the detector optical system 142 (see FIG. 4A) and L is the axial distance from the detector optical system 142 to the detector surface 152. The axial distance l is comprised of a component $l_1$ of ray propagation outside the prism, between the prism exit surface and the first lens element in the detector optical system 142, and another component $l_2$ of ray propagation inside the prism between the coupling interface INT and the prism exit surface. The contribution of the component $l_2$ into the effective distance l is given by $$\frac{l_2}{n_p},$$

reduced by a factor $$\frac{1}{n_p}$$

due to the prism-air refraction at the exit prism surface. In an example, L is the distance from the first lens element in the detector optical system 142 to the detector surface 152, where "first" indicates that the lens element is closest to the coupling prism 42 on the optical path. In some embodiments the contribution of the component $l_2$ can be considered small compared to $l_1$ and can be neglected such that the distance $l_1$ can serve as the effective distance l, in which case the resulting small systematic error will be absorbed by the system-specific calibration parameter $\gamma$. The length ratio l/L and its tolerance value & is discussed in greater detail below. In some embodiments the distance l is minimized or reduced as compared to what is known in the prior art, without regard to the ratio l/L. In other embodiments, the ratio l/R is reduced below a preferred threshold to ensure adequate measurement accuracy, where R is the radius of curvature in the measurement location of the CS substrate being measured.

FIG. 6B illustrates the proposed method of limiting the calibration error by minimizing the distance l, the ratio l/R, or the ratio l/L. The mapping between effective index of an optical mode in the CS substrate 10 and the corresponding position x on the sensor plane is mediated by the incidence angle of the illuminating ray coupled to the optical mode via the prism coupling. Two different positions (e.g., $x_1$ and $x_2$) separated by distance Δx are seen along with their associated angles $\alpha_1$ and $\alpha_2$.

The principal rays pass through the center of the detector optical system 142 so that that the ray with incidence angle $\alpha_1$ is reflected by a locally tilted portion of the top surface 12 of the CS substrate 10, where the locally tilted portion is due to the surface curvature. This makes the angle of propagation inside the coupling prism 42 relative to the vertical normal to the contact top surface 12 be slightly different, e.g., $(\alpha_1-\theta)$. This difference is translated into a slightly different spacing of the corresponding mode line positions on the sensor plane.

As can be seen from FIG. 6B, the curvature-induced local tilt of the coupling top surface 12 of the CS substrate 10 increases in proportion to the distance along the optical ray from the center of the detector optical system 142 (lens) to the coupling location (point A on the drawing can be taken as representative of the target coupling location). This is because the angle $\theta$ is proportional to the distance AB, and the distance AB increases when the distance between the lens and the prism increases, owing to the angular separation between $\alpha_1$ and $\alpha_2$.

Reducing the calibration error can be achieved by minimizing the distance between the detector optical system 142 and the coupling location (interface INT). In an example, the distance $l_1$ between the detector optical system 142 and the prism output surface 45 is less than 20 mm, preferably less than 15 mm, 10 mm, even less than 6 mm, and the prism length is 12 mm or less. In another example, the prism length is less than 8 mm or less than 7 mm. In another embodiment, the prism length is not restricted, but the distance between the target location (point A) and the end corner of the prism (closest to the detector optical system 142) is limited to less than 6 mm, preferably less than 5 mm, 4 mm, or 3.5 mm.

Also from the drawing in FIG. 6B can be observed that the local tilt $\theta$ at point B is inversely proportional to the radius of curvature R of the CS substrate 10. Hence, the calibration error will be reduced in proportion to R, so that reducing or minimizing the ratio l/R will reduce or minimize the calibration error. The calibration error is equivalently reduced by reducing the ratio l/L or l/f, due to an association between the radius of curvature R and the distance at which the sharpest image is obtained.

In examples described herein that use adaptive focusing, reducing or minimizing the ratio l/L below a preferred target can be considered a preferred approach when the adaptive focusing is based on changing the focal length of the detector optical system 142. Alternatively, reducing the ratio l/f below a preferred target can be considered a preferred approach when the system uses a detector optical system 142 having a fixed focal length and adaptive focusing is enabled via moving the detector optical system 142, a component (lens) therein or by moving the digital detector 150 along the optical axis to change the distance L.

FIG. 6B also shows the curved top surface 12 of the CS substrate as having a radius of curvature R and also shows two planes A and B associated with locations where light rays from the focused light beam 116F are made incident upon the CS substrate 10 top surface 12 through the interface INT and form the reflected light beam 116R. The planes (locations) A and B are also shown in FIG. 6A. Note that in FIG. 6B the location B has more space between the prism coupling surface 44 and the top surface 12 of the CS substrate 10. Note that for the flat CS substrate 10, the planes A and B are parallel.

Note also that the calibration correction disclosed herein is applicable even when the top surface 12 of the CS substrate 10 is concave. FIG. 6B is only used to illustrate the calibration issue and is not meant to restrict the scope of the inventive methods and systems to only measurement of surfaces with convex curvature at the measurement location. When measuring a convex surface, the position of the detector optical system 142 cannot be shifted closer to the coupling prism 42 than $l_1=0$, so some of the embodiments involving adaptively moving the lens along second axis A2 may have a limited range of application when measuring convex surfaces. That said, moving the detector surface 152 along the second axis A2 can be used in such cases instead of moving the detector optical system 142, and dynamic adjustment of the focal length can also be used (e.g., by employing a liquid lens). Thus, the inventive methods and systems disclosed herein are generally applicable for both convex and concave curvature of the parts (CS substrate 10) at the measurement location.

The calibration process is performed to reduce or eliminate errors in the calculation of one or more stress-related characteristics of the curved CS substrate 10 resulting from ignoring a change in the relationship between the detected fringe spacing $\Delta x$ in the mode spectrum image and the spacing of effective indices corresponding to the fringes or positions on the sensor when changing focus to obtain the highest contrast mode spectrum 160 image for a curved CS substrate 10.

Example Measurement Processes

A generalized example of the process of measurement with recalibration comprises the following main steps:

1) adjusting the focus of the detector optical system (relative to a reference focus, such as the best focus for a flat CS substrate) to maximize the contrast or sharpness in the mode spectrum image as detected by the digital detector 150;
2) capturing a digital image of the maximum contrast or sharpness mode spectrum image to form a digital mode spectrum image;
3) applying a correction relationship or correction factor Q to the digital mode spectrum image to form a modified or corrected digital mode spectrum image that can be processed using the initial system calibration based on measuring a flat CS substrate; and
4) processing the modified or corrected digital mode spectrum using the same process for the mode spectrum image of a flat CS substrate to determine one or more stress-related characteristics of the curved CS substrate being measured.

An alternative generalized procedure of the process of measurement with recalibration comprises the following main steps:

1) adjusting the focus of the detector optical system (relative to a reference focus, such as the best focus for a flat CS substrate) to maximize the contrast or sharpness in the mode spectrum image as detected by the digital detector 150;
2) capturing a digital image of the maximum contrast or maximum sharpness mode spectrum image to form a digital mode spectrum image;
3) processing the digital mode spectrum using the same process for the mode spectrum image of a flat CS substrate to determine one or more index or stress-related characteristics of the curved CS substrate being measured; and
5) applying a correction factor Q on the calculated index-related or stress-related characteristics to obtain correct values consistent with the corrected calibration.

Yet another alternative generalized procedure of the process of measurement with dynamic recalibration (or dynamic calibration) comprises the following main steps:

1) adjusting the focus of the detector optical system (relative to a reference focus, such as the best focus for a flat CS substrate) to maximize the contrast or sharpness in the mode spectrum image as detected by the digital detector 150;

2) capturing a digital image of the mode spectrum image to form a digital mode spectrum image;

3) applying a correction factor Q to calculate a dynamic calibration relationship or dynamic calibration parameter $K_d$; and 4) processing the digital mode spectrum using the dynamic calibration relationship or dynamic calibration parameter $K_d$ to determine one or more index or stress-related characteristics of the curved CS substrate being measured.

An example method for measuring a curved CS substrate 10 in the system 100 that employs the recalibration process can include:

1) adjusting the focus f by an amount $\Delta f$ from a first focus position $f_1$ to a second position $f_2$ (so that $\Delta f = f_2 - f_1$) to obtain a maximum (highest) contrast mode spectrum image at the image plane IP and the detector surface 152;

2) capturing the maximum contrast mode spectrum image with the digital detector 150 to form a digital mode spectrum image;

3) determining an amount of distortion D(x) in the TM and TE mode spectra TIR sections 161TM and 161TE as the ratio of the spacings $\Delta x$ of the TM and TE mode lines 163TM and 163TE in the captured mode spectrum image to those of the reference mode spectrum (e.g., reference mode-line spacings), noting that the distortion D(x) may not typically be constant (i.e., a simple magnification) and may vary with the mode spectrum coordinate x;

4) applying a correction factor $F_c(x)=1/D(x)$ to the digital mode spectrum image to define a modified or corrected digital mode spectrum image to maintain the calibration of the mode spacings for the calculations used to determine the stress-related characteristics of the CS substrate being measured; and 5) processing the modified or corrected digital mode spectrum image using the same process as used for a flat CS substrate to determine one or more stress-related characteristics of the CS substrate being measured. The distortion D(x) can be determined to be a mathematical function or can be a set of discrete factors for each measured mode-line spacing $\Delta x$.

Examples of the method utilize adjusting the focus of the detector optical system 142 in any one of a number of different ways known in the art. In one example, the focus can be adjusted by axially moving the detector optical system 142 using the translation device 156. In another example, the detector optical system 142 is configured to have an adjustable focus as is known in the art. For example, the detector optical system 142 can be configured as a zoom lens or a liquid lens. In another example described below, an array or collection (set) of lenses with different focal lengths and being insertable and removable into the detector system 140 can be employed to obtain the sharpest mode spectrum 160 image.

Regardless of the particular type of focus adjustment used, the focus can be adjusted so that the mode spectrum 160 image has the greatest contrast at the digital detector 150 in order to obtain the most precise measurements of the one or more stress-related characteristics of interest. Adjustable focusing coupled with application of a calibration correction using an imaging parameter (e.g., {magnification M} a correction factor Fc as used above by way of example) allows for an accurate measurement of stress-related features of a curved CS substrate 10.

For example, if the distortion D(x) is selected as the imaging parameter, then a change in the focus f can be related to a change in the distortion at the image plane IP to define a rate of change of distortion D with focus change $\Delta D/\Delta f$. This quantity can be measured empirically using system 100 by measuring the fringe (mode line) spacing $\Delta x$ at a set of focus positions. A best-fit to the measurement data can provide a look-up table or a mathematical relationship suitable for expressing $\Delta D/\Delta f$ in differential form dD/df. The geometry of the measurement system 100 can also provide a mathematical expression for dD/df as discussed below.

In another aspect of the disclosure discussed above in connections with FIGS. 4B through 4D, one or more light restrictors 200 can be employed to enhance the contrast of the mode spectrum 160 image. The light restrictors 200 can be used for example when the curvature of the CS substrate is substantially elliptical, cylindrical or conical, with the recalibration-compensated curvature residing in the cross-section along the main optical path, and especially when the curved surface of the CS substrate is saddle-shaped.

Calibration Correction Based on System Geometry

An imaging condition for obtaining a sharp mode spectrum 160 image in the presence of CS substrate curvature can be determined from the geometry of the system 100 as best seen in FIG. 6B. Note that two angles $\alpha_1$ and $\alpha_2$ are shown in FIGS. 6A and 6B for the light ray angles $\alpha$ for the two example light rays in the focused and reflected light beams 116F and 116R. The angle $\alpha$ of FIG. 4A is for the central (on axis) light ray. When the CS substrate 10 is curved, there are multiple angles $\alpha$ in the illumination (or "focused") beam 116F that correspond to a particular location x on the screen, and not just a single angle. This is particularly true when an index-matching fluid 50 is used since this provides a larger area of optical contact between the prism coupling surface 44 and the curved top surface 12 of the CS substrate, especially when the index-matching fluid 50 has high refractive index close to that of the prism. For each input angle $\alpha$ ($\alpha_1$, $\alpha_2$, ... ) there is a corresponding exit angle $\beta=(\beta_1, \beta_2, \ldots)$. Here one should not confuse a range of input angles $\alpha$ on the illumination side corresponding to one location in the mode spectrum image (due to substrate curvature) with the different angles $\beta$ (or $\beta_e$) that are associated with two different locations in the mode spectrum image corresponding to two different example mode indices.

The imaging condition takes into account the local curvature R of the top surface 12 of the CS substrate 10 at the measurement location (interface INT) and in the beam plane, i.e., the plane containing the focused and reflected light beams 116F and 116R (e.g., the x-z plane in the local coordinate system of FIG. 4A), and is also based on the focal length f of the detector optical system 142 as well as the distance L from the detector optical system to the detector surface 152.

The preferred imaging condition for a curved CS substrate 10 can be determined from the geometry of FIG. 6B and can be expressed mathematically as:

$$\frac{R \cos\alpha}{n_p} = \frac{\gamma f L}{L-f} \equiv \gamma_L \frac{f}{\Delta f} \equiv \gamma f\left(1 + \frac{f}{\Delta f}\right),$$

where $n_p$ is the prism refractive index, α is the incidence angle of the light ray on the prism-specimen interface INT coupled to specimen optical mode with effective index $$n_{\textit{eff}}\left(\text{wherein } \alpha = a\sin\left(\frac{n_{\textit{eff}}}{n_p}\right)\right)$$

(see FIG. 4A), R is the local radius of curvature of the specimen in the measurement location in the measurement x-z plane, f is the focal length of the detector optical system 142, and Δf=L−f is the difference between the optical system-detector distance for a sharp spectrum in the presence of curvature, with the same lens-detector distance for a sharp spectrum for a flat CS substrate, in which case (L=f) so that Δf=0. The parameter γ is a calibration parameter for the measurement system. The calibration parameter γ accounts in part for the relationship between the radius of the curved or warped surface and its optical power at the measurement angle of incidence.

In addition, the calibration parameter γ may also account for limited accuracy of the assumed values of focal length of the various components of the lens system, or the limited accuracy of measuring their positions relative to the prism position or the sensor position. When the CS substrate 10 top surface 12 is not flat, obtaining a sharp mode spectrum image by only adjusting L or f will not in general be sufficient to obtain an accurate measurement of the effective index spacings in the mode spectrum and thus an accurate measurement of the stress-related properties.

This is mainly because the curvature of the CS substrate 10 conspires with the change of focusing (necessary to obtain a sharp spectrum) to change the mapping between the positions of the TM and TE mode lines 163TM and 163TM at the detector surface 152 and the effective indices of the corresponding optical modes of the NSWG 18. As noted above, this change in mapping was characterized above as a magnification change in the mode spectrum image with possible accompanying distortion. The change in mapping was also characterized as a calibration change.

The following equation relates the mode spacing Δx for the captured mode spectrum image to the effective indices $n_{\textit{eff}}$ of the captured mode spectrum 160 using the geometrical features of the system 100:

$$\Delta n_{\textit{eff}} = K_d \Delta x = \frac{K_f}{1-F_c}\Delta x,$$

where $K_f$ is the calibration parameter for measuring flat part and $K_d$ is the dynamic (or corrected) calibration parameter for measuring the curved part.

The mode-line spacing Δx can be expressed as:

$$\Delta x = [1-F_c]/K_f \cdot n_{\textit{eff}}, \text{ where } F_c \text{ is a correction factor defined as:}$$

$$F_c \approx P \times Q\cos\alpha \equiv P \times Q\frac{\sqrt{n_p^2 - n_{\textit{eff}}^2}}{n_p},$$

where the parameters P and Q can be expressed as:

$$P = \frac{1}{K_f L} \equiv \frac{d\beta_e}{dn_{\textit{eff}}}$$

-continued $$Q = \frac{l_1 + \frac{l_2}{n_p L}}{\gamma f}(L-f) \equiv \frac{l(L-f)}{\gamma f L} \equiv \frac{2l}{\gamma R}\frac{n_p}{\cos\alpha}.$$

The parameter P accounts for the change in the ray angle $\beta_e$ with effective index $n_{\textit{eff}}$ while the parameter Q represents the effect of the estimated sample curvature on the imaging properties of the system for the specific incidence angle α of photons (light) that couple to the optical modes of interest in the specimen.

As noted above, the parameter Δx is the spacing on the detector surface 152 and can represent the mode-line spacing associated with a mode line having given effective index $n_{\textit{eff}}$ and an adjacent mode line. Note that the parameter Q includes the length ratio l/L where $l=l_1+l_2/n_p$. The parameter R is the estimated radius of curvature of the measured part in the measurement location, and γ is the system-specific calibration parameter for measuring curved or warped parts. Also note that the parameter Q is found in a different expression to be proportional to the ratio l/R.

Some of the embodiments disclosed herein seek to reduce measurement errors by designing the system to reduce the ratio l/L or to reduce/as much as possible in the system design so as to achieve as small l/R and/or l/L as possible.

The detailed expression relating feature spacings on the sensor and corresponding differences in effective index is:

$$\Delta x = \left(1 - \frac{d\beta_2}{dn_{\textit{eff}}}\cos\alpha\frac{\left(l_1 + \frac{l_2}{n_p}\right)}{\gamma f L}(L-f)\right)\frac{d\beta_2}{dn_{\textit{eff}}}L\Delta n_{\textit{eff}}.$$

The calibration correction factor $F_c$ in this case can be approximately thought of as modification of the exit angle $\beta_e$ that changes as a function of the input angle α and so is based on evanescent prism coupling system parameters as well as the CS substrate curvature R, as indicated in the above equations.

This version of the calibration factor Fc is analogous to the aforementioned calibration correction factor $F_c=1/D(x)$ associated with measuring the distortion of the mode spacing Δx for the curved CS substrate 10. Each type of calibration correction factor, when applied appropriately according to its design, provides the same result of forming a corrected or re-calibrated mode spectrum image that can be processed using the system calibration for the corresponding flat CS substrate.

The calibration correction factor $F_c$ is applied when a readout (device) signal SD from the (adjustable) detector optical system 142 is provided to the controller 130. The readout signal SD may provide a preferred combination of the position L of the axially movable detector optical system 142, the optical power $$\frac{1}{f}$$

or the focal length f for a variable-f, fixed-lens system, or the difference Δf=L−f for either type of system.

As noted above, the parameter Δx is the spacing of two features of interest (for example mode lines, or intensity transitions, or a combination thereof) in the mode spectrum image captured by the digital detector 150 while $\Delta n_{\textit{eff}}$ is the effective-index spacing of the two optical modes corresponding to the two features (for example, mode lines) in the spectral image; $l_1$ is the distance between the image-forming lens and the prism exit surface along the optical-ray path; $l_2$ is the distance in the prism between the reflection point of the optical ray at the prism-specimen interface, and the refraction point of the optical ray at the prism exit surface facing the optical sensor. It is noted that axial distance l introduced above can be expressed as $$l = l_1 + \frac{l_2}{n_p},$$

where $l_1$ and $l_2$ are shown in FIG. 4A.

The parameter $$P = \frac{d\beta_e}{dn_{eff}}$$

is the sensitivity of exit (output) angle of an optical ray at the exit facet of the prism to the effective index of the corresponding optical mode in the specimen coupled to that ray. One expression for this sensitivity is:

$$P = \frac{d\beta_e}{dn_{eff}} = \frac{\cos(\alpha_p - \alpha)}{\cos\alpha \sqrt{1 - n_p^2 \sin^2(\alpha_p - \alpha)}}$$

where $\alpha_p$ is the angle between the prism coupling plane and the prism exit plane facing the camera sensor (see FIG. 6B).

The above calibration formula is quite accurate when the incidence angle $\alpha$ of the focused light beam 116F is not very close to 90°. For example, in the most commonly used stress-measurement instrument FSM-6000, the prism base angle is 60°, the prism index $n_p$ is about 1.72, and when the bulk index ng of the CS substrate 10 is about 1.51, the angle $\alpha$ is about 61.4°, which is substantially smaller than 90°.

In many cases of practical interest, the distance $$l = l_1 + \frac{l_2}{n_p}$$

need not be determined very precisely. In an example, an estimate to within about 10% or even 20% may be adequate for achieving suitable accuracy in the measurements stress parameters such as the surface compressive stress CS and the depth of layer DOL.

Example Methods Using the System Geometry Calibration

As discussed above, the typical evanescent prism coupling system is designed to perform measurements on flat (non-curved) samples. For flat samples, the mode spectrum 160 image corresponding to the bound modes of the NSWG 18 in the sample being measured is sharp at the normal detector optical system focal length f.

When the sample is curved, the mode spectrum image is no longer sharp. So an aspect of the methods disclosed here includes obtaining a sharp mode spectrum image. This is done by changing the focus position (focal length) f of the detector optical system 142. This can be accomplished by axially moving the detector optical system 142 or the detector surface 152 of the digital detector 150 (i.e., changing L), or by changing the focal length f of the detector optical system (e.g., by using a liquid lens that has a variable focal length), or by changing both L and f.

When measuring a curved sample, after adjusting the focus f to obtain a sharp mode spectrum 160 image, the fringe spacings Δx at the digital detector 150 may not be the same as when measuring a flat sample with the same mode spectrum. This is problematic because an accurate measurement of a stress-related characteristic of the sample can only be obtained by accounting for the change in the fringe spacings Δx. In other words, one simply cannot change the focus f of the detector optical system (i.e., re-focus the detector optical system) to obtain a sharp mode spectrum image and then process this sharp image the usual way, i.e., using the usual equations for a flat sample. This will lead to an incorrect characterization of the stress of the curved sample. Furthermore, the change of the fringe spacings Δx is not properly described by a mere ratio of the focal lengths of sharpest imaging for a flat and curved substrate, or the ratio of changing L.

Consequently, the initial system calibration performed with the assumption of measuring only flat samples needs to be corrected when measuring a curved sample.

When the curvature of the part is not precisely known in advance, the calibration correction can be dynamic, e.g., a signal that accounts for the distance L or the focal length f can be measured and used to correct the calibration. Once the calibration is corrected, CS and DOL (and CS), where applicable) can be calculated using the same equations used for a flat sample.

Indirect and Direct Methods

Figure 7A:
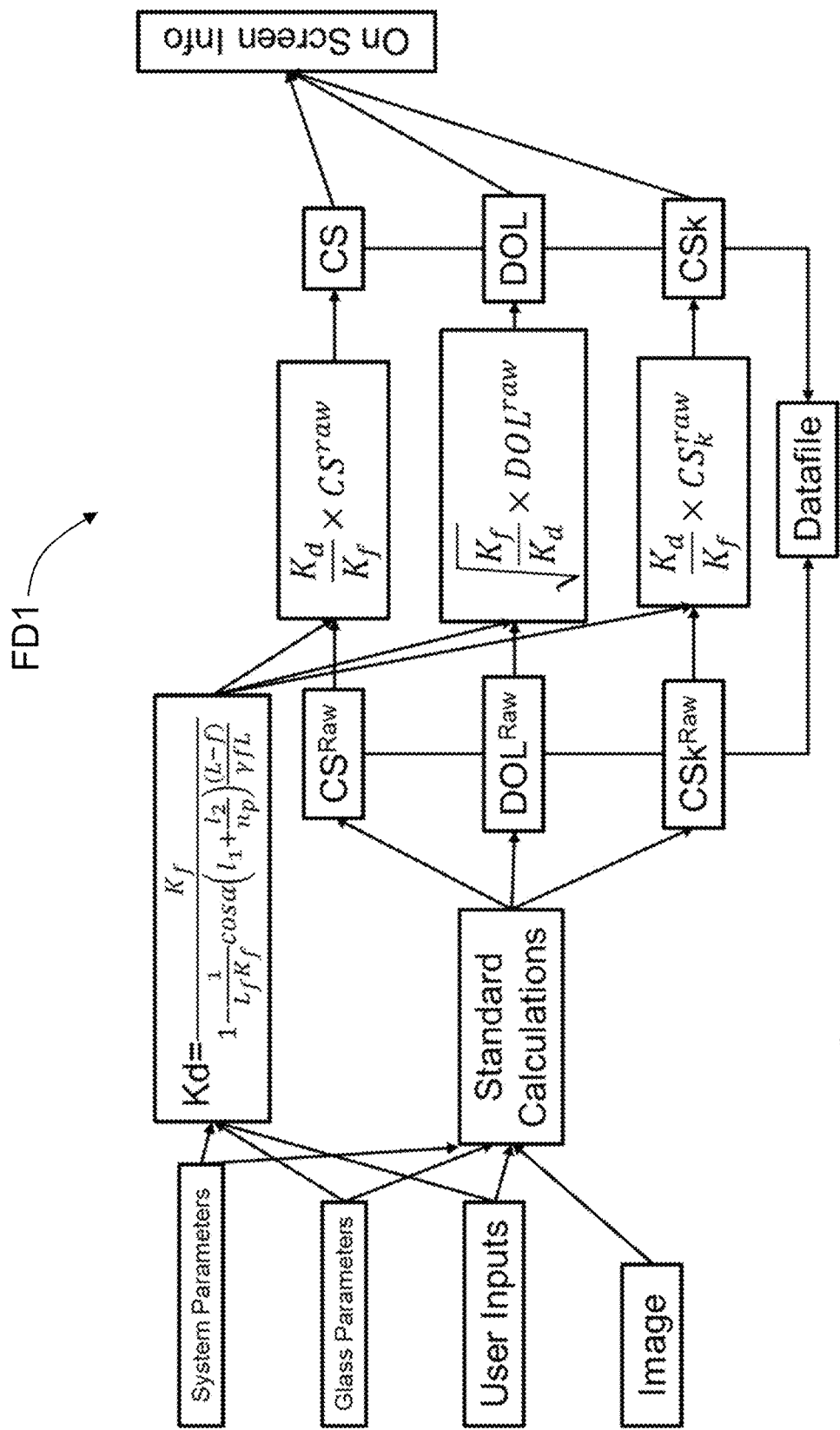
FIGS. 7A and 7B are flow diagrams of two example methods of determining the surface compressive stress CS, the knee compressive stress CSk and the depth of layer DOL.
Figure 7B:
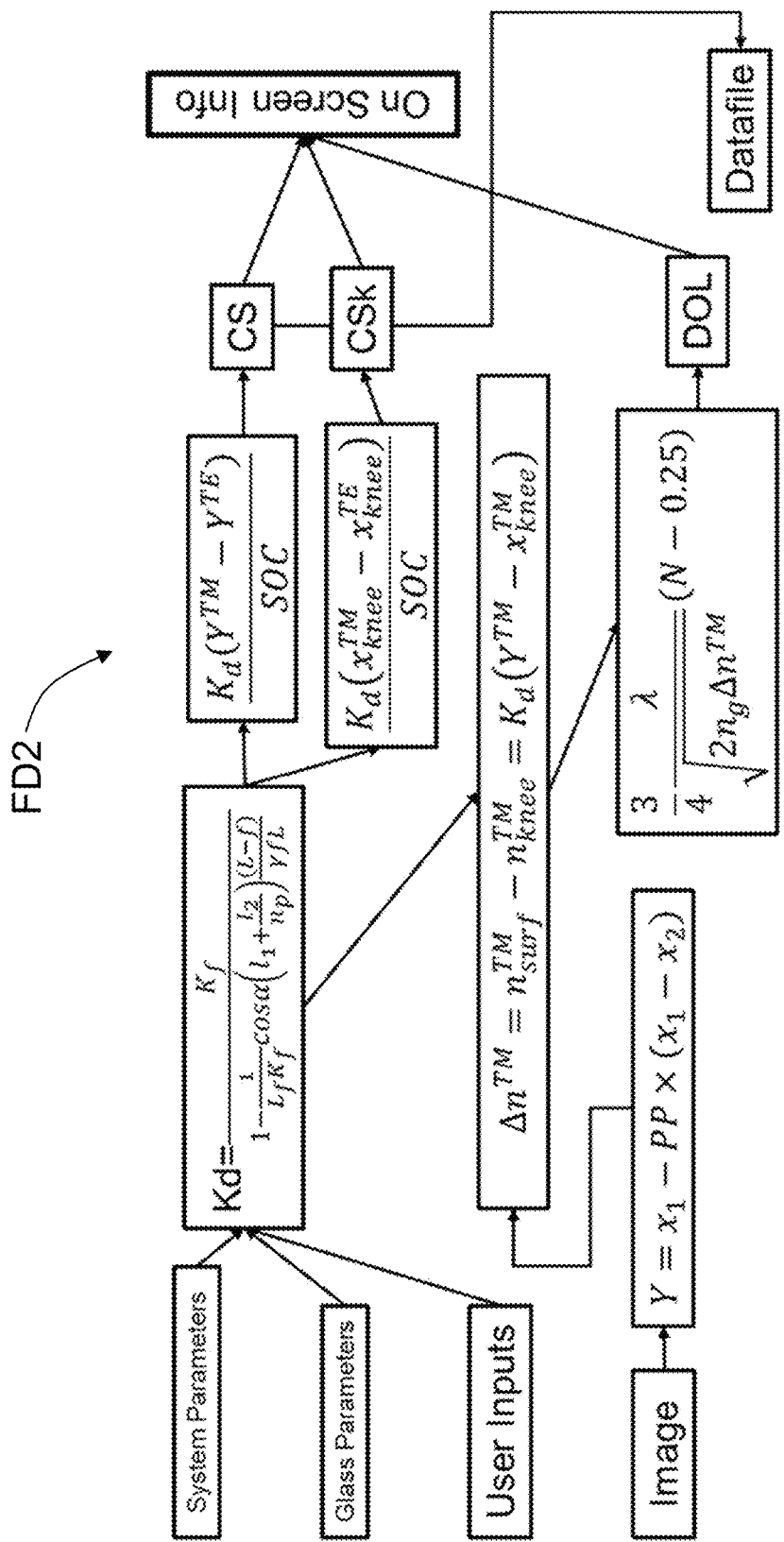

FIGS. 7A and 7B depict flow diagrams FD1 and FD2 that respectively set forth two main example methods for determining a stress-based characteristic of a curved CS substrate 10. By way of example, the stress-based characteristics determined using the methods are the (surface) compressive stress CS, the knee stress $CS_k$ and the depth of layer DOL.

The flow diagrams FD1 and FD2 show which information comes from the mode spectrum image via the "image" box. The diagrams also show which information comes from "user inputs," from the "glass parameters" of the sample being measured and from the "system parameters" of the system 100 being used. The results of each process can be outputted to a "datafile" or displayed as "on screen info." The "standard calculations" in FIG. 7A are the basic calculations used for a flat sample.

The "indirect" method outlined in FIG. 7A involves first measuring or calculating the raw values $CS^{(raw)}$, $CS_k^{(raw)}$ and $DOL^{(raw)}$ of these stress-based characteristics and then correcting these values after the measurement or calculation is made using a dynamic calibration factor $K_d/K_f$.

The "direct" methods outlined in FIG. 7B skip the measurement or calculation of the raw values $CS^{(raw)}$, $CS_k^{(raw)}$, and $DOL^{(raw)}$ and use the dynamic calibration parameter $K_d$ to go straight to calculating the final values CS, $CS_k$ and DOL.

The relevant parameters used in the methods are summarized below for convenience, noting that the parameters are also defined and described above and shown in the various corresponding Figures.

1) Detector optical system (lens) focal length $$f = \frac{LR\cos\alpha}{R\cos\alpha + \gamma_1 n_p L},$$

where L is the lens-detector distance, $n_p$ is the coupling prism refractive index, R is the local radius of curvature of the top surface 12 of the CS substrate 10 at the measurement location, a is the incidence angle of the light ray at prism-sample interface INT (see FIG. 6B).

$$\cos\alpha = \frac{1}{n_p}\sqrt{n_p^2 - n_{eff}^2}.$$

3) $\gamma_1$ is a dimensionless parameter that depends on the system arrangement and in an example may be in the range from 1.5 to 2.5, with example values being 1.6 and 2 for example systems 100 used by the inventors. The value of $\gamma_1$ can be obtained by measuring known (reference samples) using the methods described herein and backing out a value that makes the calculations consistent with the known stress parameters of the reference samples.

4) Calibration constant $$K_f\left[\frac{RIU}{mm}\right] \equiv \frac{1}{L_f \frac{d\beta_e}{dn_{eff}}} \equiv \frac{1}{f \frac{d\beta_e}{dn_{eff}}}.$$

When the sample is truly flat, then $L_f = f$ for the condition for maximum fringe sharpness (contrast).

$$K_d = \frac{K_f}{1 - \frac{1}{L_f K_f}\cos\alpha\left(l_1 + \frac{l_2}{n_p}\right)\frac{(L-f)}{\gamma f L}} \quad 5)$$

and associates the effective index $n_{eff}$ with the spacing $\Delta x$ at the detector plane IP for the maximum fringe (mode line) sharpness (contrast) condition for a curved sample.

Indirect Method

An example indirect method has the following steps:

1) Calibrate the system using a flat sample, to obtain $K_f$ and $L_f$.

2) If the system uses fixed L, and only varies the focus of the lens, then $L \propto L_f =$ const.

When measuring the curved part, use the parameters associated with changing the focal length f of the detector optical system 142 to calculate $K_d$. In an example, this can be done using a signal from an electrically controlled liquid lens.

4) For the curved-part measurement results of CS, DOL (and $CS_k$ where applicable), use $K_d$ to convert distances on the sensor in mm to differences in index.

The result of the above steps is the following:

For CS and $CS_k$ the values will change by a factor $$\frac{K_d}{K_f} = \frac{1}{1 - \frac{1}{L_f K_f}\cos\alpha\left(l_1 + \frac{l_2}{n_p}\right)\frac{(L-f)}{\gamma f L}}$$

when compared to using the original calibration $K_f$ without correction. This factor is referred to as the dynamic calibration factor, where $K_d$ alone is referred to as the dynamic calibration parameter.

The DOL will change by a factor $$\sqrt{\frac{K_f}{K_d}} = \sqrt{1 - \frac{1}{L_f K_f}\cos\alpha\left(l_1 + \frac{l_2}{n_p}\right)\frac{(L-f)}{\gamma f L}}.$$

When CS increases as a result of the correction, DOL will decrease, and vice-versa.

If raw values $CS^{(raw)}$, $CS_d^{(raw)}$ and $DOL^{(raw)}$ were calculated with the flat calibration $K_f$, then the correction formulas are:

$$CS = \frac{K_d}{K_f} \times CS^{(raw)}$$

$$CS_k = \frac{K_d}{K_f} \times CS_k^{(raw)}$$

$$DOL = \frac{K_f}{K_d} \times DOL^{(raw)}$$

To obtain the corrected values for CS, $CS_k$ and DOL, the raw values $CS^{(raw)}$, $CS_k^{(raw)}$ and $DOL^{(raw)}$ and the dynamic calibration parameter $K_d$ need to be obtained. This can be accomplished using the following method steps:

Obtain sharp spectrum for a reference (known) flat part by adjusting f. Record $L_f$ and $f_{flat}$.

Obtain and record the calibration constant $K_f$ for the flat part for $K_f$ using the relationship $$K_f\left[\frac{RIU}{mm}\right] = \frac{1}{L_f \frac{d\beta e}{dn_{eff}}} \equiv \frac{1}{f \frac{d\beta e}{dn_{eff}}}.$$

Alternatively, obtain $K_f$ by measuring the compressive stress of a trusted calibration flat specimen, setting the value $K_f$ such that the calculated compressive stress from the flat mode spectrum of the trusted flat specimen agrees with the known calibration value of compressive stress of said specimen.

Obtain sharp spectrum on curved part by changing the focus f of the detector optical system. Record the resulting f and L (one or both may be changed).

Record raw values $CS^{(raw)}$, $CS_k^{(raw)}$ and $DOL^{(raw)}$ for sharp spectrum on curved part according to standard FSM software:

$$CS^{(raw)} = \frac{\Delta n_{surf}^{TM-TE}}{SOC} \equiv \frac{K_f(Y^{TM} - Y^{TE})}{SOC};$$

$$CS_k^{raw} = \frac{\Delta n_{knee}^{TM-TE}}{SOC} \equiv \frac{K_f(x_{knee}^{TM} - x_{knee}^{TE})}{SOC};$$

$$DOL^{raw} = \frac{3}{4}\frac{\lambda}{\sqrt{2n_g\Delta n^{TM}}}(N - 0.25),$$

where $n_g$ is the bulk refractive index of the (glass) sample and where $\Delta n^{TM} = n_{surf}^{TM} - n_{knee}^{TM} = K_f(Y^{TM} - x_{knee}^{TM})$ and $Y = x_1 - PP \times (x_1 - x_2),$ where PP is a "profile parameter" accounting for the shape of the index profile of the measured specimen nearest the measured surface (see FIG. 7B). For example, the appropriate value for PP for a linearly decreasing refractive index with depth for a few wavelengths from the surface is PP=1.317. A commonly used value for PP is 0.9, a good compromise for a variety of profiles having a more rounded distribution of refractive index nearest the surface. The profile parameter is not changed during the recalibration, static or dynamic.

Calculate the dynamic calibration $K_d$ for the curved-sample measurement:

$$K_d = \frac{K_f}{1 - \frac{1}{L_f K_f}\cos\alpha\left(l_1 + \frac{l_2}{n_p}\right)\frac{(L-f)}{\gamma f L}}.$$

Use $K_d$ per above in the correction formulas for CS, CSk and DOL set forth above.

Direct Method

With reference to FIG. 7B, an example direct method is similar to that described above but avoids measuring or calculating the raw values $CS^{(raw)}$, $CS_k^{(raw)}$ and $DOL^{(raw)}$ and instead uses the dynamic calibration parameter $K_d$ to directly calculate CS, $CS_k$ and DOL.

The example direct method can be carried out as follows:

Obtain a sharp mode spectrum image for flat (reference) part by adjusting f and record $L_f$ and $f_{flat}$.

Obtain and record calibration constant $K_f$ by using a trusted calibration specimen with known compressive stress, or by using the relationship:

$$K_f\left[\frac{RIU}{mm}\right] = \frac{1}{L_f \frac{d\beta e}{dn_{eff}}} \equiv \frac{1}{f \frac{d\beta e}{dn_{eff}}}.$$

Obtain sharp spectrum on the curved part by changing the detector optical system focus and record the resulting focal length f.

Calculate the dynamic calibration $K_d$ for the curved-sample measurement using the relationship:

$$K_d = \frac{K_f}{1 - \frac{1}{L_f K_f}\cos\alpha\left(l_1 + \frac{l_2}{n_p}\right)\frac{(L-f)}{\gamma f L}}.$$

Calculate CS, $CS_k$, and DOL directly using the following relationships:

$$CS = \frac{\Delta n_{surf}^{TM-TE}}{SOC} \equiv \frac{K_d(Y^{TM} - Y^{TE})}{SOC};$$

$$CS_k = \frac{\Delta n_{knee}^{TM-TE}}{SOC} \equiv \frac{K_d(x_{knee}^{TM} - x_{knee}^{TE})}{SOC};$$

$$DOL = \frac{3}{4}\frac{\lambda}{\sqrt{2n_g \Delta n^{TM}}}(N - 0.25),$$

where $\Delta n^{TM} = n_{surf}^{TM} - n_{knee}^{TM} = K_d(Y^{TM} - x_{knee}^{TM})$ and $Y = x_1 - PP \times (x_1 - x_2)$, where the profile parameter PP is chosen in advance, examples being PP=1.317 for a linear index distribution near the surface, and PP=0.9 a commonly used compromise value for a variety of commonly occurring distributions as a result of chemical strengthening (see FIG. 7B).

Example Measurements Made Using the Enhanced Systems and Methods

Example measurements were made on a set of CS substrates 10 having different curvatures and formed at the same time using a common IOX process that employed a $KNO_3$ bath so that the CS substrates would have the same or substantially the same amounts of compressive stress CS and the same or substantially the same depths of layer DOL. The CS substrates 10 had different curvatures. The system 100 had a variable-focus detector optical system 142 that was placed a distance L=167.2 mm from the detector surface 152 of the digital detector 150. The optical power 1/f of the variable focus detector optical system was adjusted to produce a sharp mode spectrum image for each CS substrate 10. The system 100 was equipped with light restrictors 200 such as shown in the example system 100 of FIG. 4A.

The wavelength $\lambda_A$ of the measurement light beam 116 was 790 nm. This relatively long wavelength was used to reduce the sensitivity of mode spectrum image sharpness to optical aberrations. The prism refractive index $n_p=1.71$ at the measurement wavelength, and the bulk index $n_B$ of the CS substrate was about 1.51 at the measurement wavelength. The detector optical system 142 was located an axial distance along the beam path (l=140 mm from the prism output surface 45, and the ray traveled a distance $l_1 \approx 5$ mm inside the coupling prism 42 between the measurement location and the output surface. The exit-angle sensitivity was $$\frac{d\beta_2}{dn_{eff}} = 2.133.$$

Figure 8A:
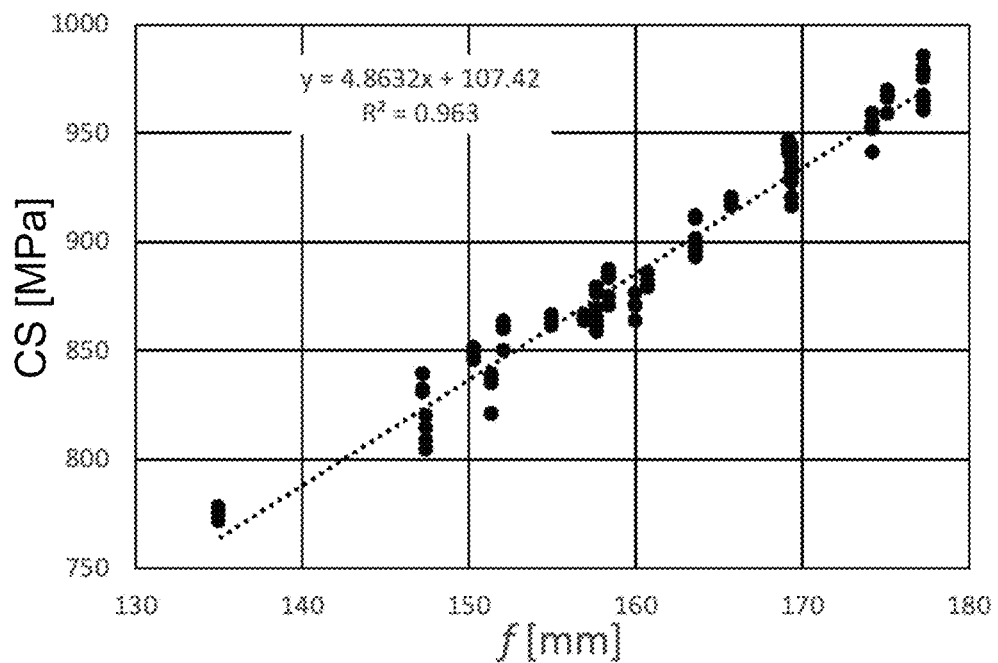
FIG. 8A is a plot of measurements of the compressive stress CS in megapascals (MPa) versus the focal length f in millimeters (mm) of the detector optical system for an example CS substrate for the case without calibration correction and showing a best-fit line through the data.

FIG. 8A is a plot of measurements of the reported surface compressive stress CS in megapascals (MPa) versus the focal length f in millimeters (mm) of the detector optical system 142 for example CS substrates, along with a best-fit line through the data. The focal length f was the focal length that provide the highest contrast mode spectrum image.

The measurements result of FIG. 8A did not employ the calibration correction. The plot of FIG. 8A shows that the measured raw value of the surface compressive stress CS has a strong dependence on the focal length f of the detector optical system 142, unlike the actual values of surface compressive stress which are expected to have negligible dependence on sample curvature.

Figure 8B:
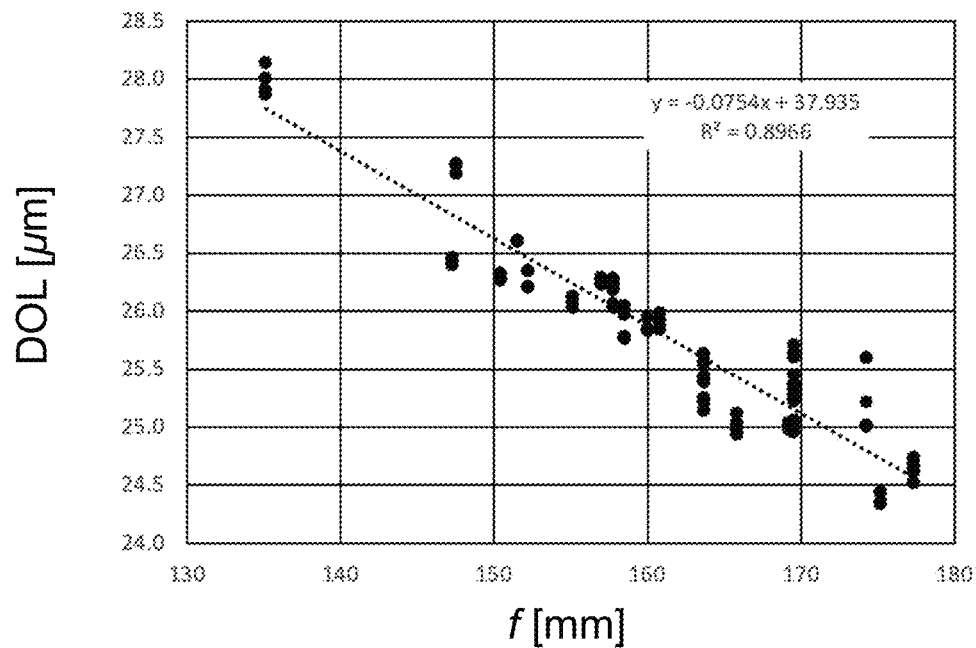
FIG. 8B is a plot of the depth of layer (DOL) in microns (μm) versus the focal length f (mm) of the detector optical system obtained using the same spectra used for FIG. 8A, also without calibration correction.

FIG. 8B is a plot of the depth of layer (DOL) in microns (μm) versus the best-contrast focal length f (mm) of the focusing lens of the detector system for the same example CS substrates of FIG. 8A, along with a best-fit line through the data. Even though all specimens should have substantially the same DOL, there is a strong dependence of the raw depth of layer DOL on the focal length corresponding to the sharpest mode spectrum image.

Figure 9A:
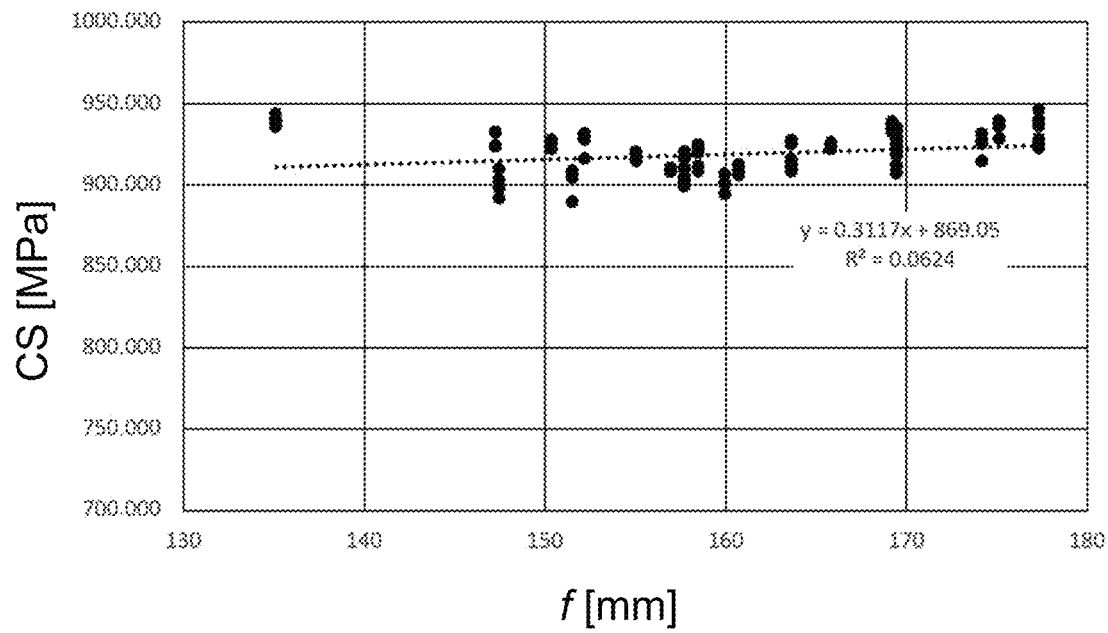
FIGS. 9A and 9B are the same as FIGS. 8A and 8B but for the case where calibration correction has been applied and showing significantly more consistent measurements of the compressive stress CS and the depth of layer DOL.
Figure 9B:
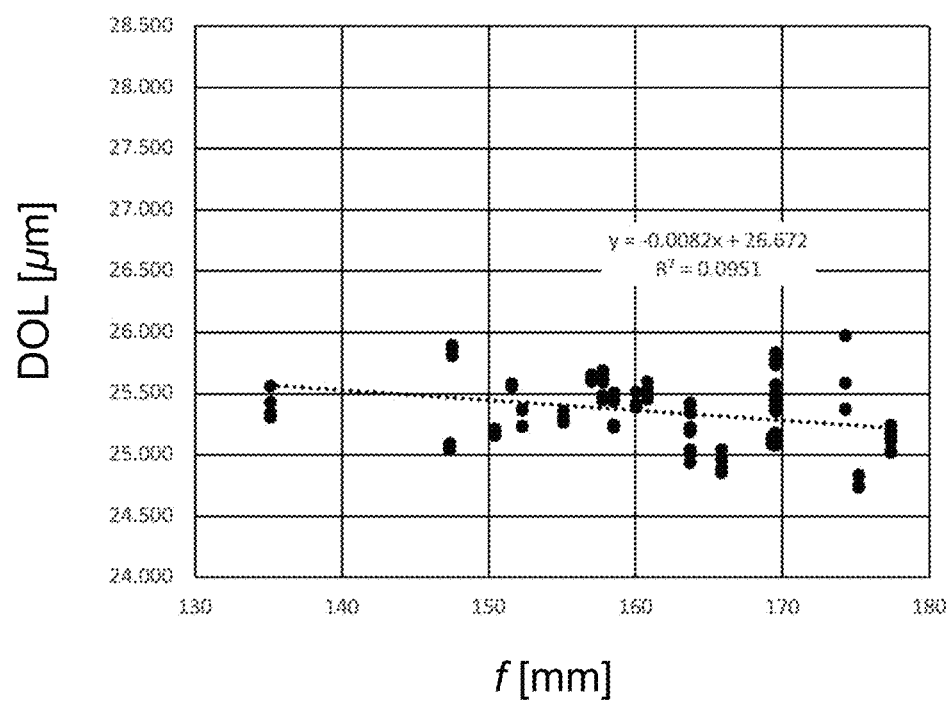

FIGS. 9A and 9B are the plots of surface CS and DOL obtained from the same prism-coupling spectra as the results of FIGS. 8A and 8B but after the dynamic calibration correction method for the curved CS substrate 10 top surfaces 12 as described above was applied to the measurements. The plots of FIG. 9A and FIG. 9B show that the CS and DOL values for all measurements became substantially independent of the sharpest-spectrum focal length f, as is expected for the actual surface stress and DOL for the substrates of same thickness and varying curvature having undergone identical chemical strengthening. The calibration parameter γ of the system was set to 1.17.

When the incidence angle α is very close to 90°, such as 80°≤α≤90°, a more complex calibration method may be needed for adequate accuracy. On the other hand, in one embodiment, reducing the distance between prism and the image-forming lens can reduce the systematic error of using the above simplified calibration correction, or even of skipping the calibration correction, to an acceptable level. In particular, it was found that the error can be reduced by reducing the distances $l_1$ and $l_2$ significantly such that $$\frac{l}{L} \equiv \frac{l_1 + \frac{l_2}{n_p}}{L} \leq \varepsilon$$

where the parameter ε is selected depending on the required accuracy of measuring CS or DOL, or another stress parameter. Depending on the breadth of the specification for compressive stress CS, for example, |ε̄ may be set at a value between 0.2 and 0.01 (i.e., 0.01≤l/L≤0.2) such as at one of the following values: 0.2, 0.15, 0.12, 0.10, 0.08, 0.06, 0.05, 0.04, 0.03, 0.01, and in some cases even less. For comparison, the measurements associated with the plots in FIGS. 8A, 8B, 9A and 9B had $$\frac{l}{L} \approx 0.86.$$

Reducing $$\frac{l}{L}$$

from 0.86 to 0.086 would reduce the slope of the uncalibrated CS results about 10-fold, which would be adequate for cases where the CS specification range is wider than 100 MPa, for example. This ratio could be achieved if the detector optical system (lens) 142 and the digital detector 150 are brought closer to the coupling prism 42, such that L=167 mm, $l_2$≈5 mm, and $l_1$=11.5 mm.

In another embodiment, a preferred reduced ratio $$\frac{l}{L} \leq \varepsilon$$

is chosen as above, and combined with application of the dynamic calibration correction, for minimizing the systematic error. In this embodiment, the error can be made very small even when the angle α exceeds 80°. When calibration correction is applied, even higher values of ε, such as 0.25 or 0.30 for example, can deliver very good results.

The system-calibration parameter γ is system-specific, characterizing how the measurement system responds to changes in the specimen curvature. The following is an example of the embodiment where a lens of fixed focal power is used to measure specimens of different curvature by changing the distance L between the lens and the sensor plane. A best-form lens with f=100 mm was positioned a distance 100 mm from the CCD sensor of the camera, and showed a sharp spectrum for a flat specimen of sodium-alumino-silicate glass ion-exchanged in a $KNO_3$-dominant bath. The distance $l_1$ between the lens and the prism was between 140 and 170 mm when the system was set up to deliver a sharp spectrum when a flat specimen was measured. The optical wavelength used in these measurements was about 590 nm, the prism and interfacing oil had refractive index of 1.72 at the measurement wavelength, and cos(α) was about 0.49. The specimens had refractive index about 1.50 in the ion-exchanged region where the bound optical modes were confined.

Specimens with intentional curvature were prepared by etching one side of the glass by different amounts. The radius of curvature of 3 curved specimens was determined by curvature measurements to be approximately 10 m, 6 m, and 4.3 m, respectively. The distance L between the lens and the sensor had to be increased by Δf=3.5 mm, 5.8 mm, and 8.1 mm, respectively, to obtain what appeared to be the sharpest spectrum in each case. The sharpness of the spectra was determined visually by the operator. The uncertainty in the value of Δf is estimated at about 0.5 mm or less, mainly due to the fact that visually the spectra appeared sharp over a small range of lens positions for each curved specimen, said range being about 1 mm wide. Based on the relationship between the measured Δf and the radius of curvature of the measured parts, it was determined that for that optical system the calibration coefficient γ was about 0.94±0.03 for the curvature range 0.1-0.23 inverse meters covered by the curved specimens.

In another embodiment, the distance l is minimized, to help achieve minimum error. The embodiment can be used with dynamic recalibration for maximum measurement precision. In some cases the embodiment with minimized l can be used even without dynamic recalibration. Possible cases of use of a system with minimized l include cases where the specifications of stress-profile control parameters (such as CS and DOL) are relatively wide, or cases where the specimen curvature is small, such as when measuring substantially flat or nominally flat specimens with small amounts of warp wherein changing the focusing dynamically will improve the sharpness of the measured features, and thus the ability to detect the features or the precision of detection of the feature positions on the sensor plane. In one aspect, reducing/comprises reducing the external distance $l_1$. This distance is typically substantially greater than 50 mm in commercial prism-coupling systems for stress measurement.

The present inventors have determined that reducing $l_1$ below 50 mm, and especially below 40 mm, 30 mm, 20 mm, 10 mm, or 5 mm, should act to progressively decrease the measurement error of stress-profile parameters induced by the presence of curvature in the measured part when the system utilizes dynamic re-focusing to get a sharp spectrum. Thus, specific embodiments of the present invention comprise a measurement system having the distance $l_1$ between the prism exit surface and the closest-to-it optical surface of the image-forming lens or lens system spaced by less than 50 mm, 40 mm, 30 mm, 20 mm, 10 mm, or 5 mm. In one embodiment, the image-forming lens is a compound lens comprising a lens of fixed focal power and a lens of variable focal power. In an example of said embodiment, the lens of fixed focal power can be the exit surface of the prism, wherein the exit surface of the prism is not flat but rather curved, to bias the system for a particular range of curvatures of the measured specimens and thus optimize the system for most effective use of the range of focal powers available from the lens having variable focal power (such as a liquid lens). All these embodiments comprising intentionally small distance $l_1$ may be used in conjunction with dynamic calibration correction when highest measurement accuracy is sought, or without dynamic calibration correction in some contexts where limited measurement accuracy may be adequate.

In an example, an embodiment comprising a liquid lens for the detector optical system 142 for forming the image of the mode spectrum is used in combination with dynamic focusing and dynamic recalibration to obtain accurate measurements of CS and DOL for 3 sets of chemically strengthened parts. Parts within each set have different amounts of curvature but similar levels of CS and DOL following having been ion exchanged simultaneously. In the example measurement system, the liquid lens could change focal length power over a significant range including both positive and negative focal powers. The liquid lens was positioned a distance L=166.7 mm from the camera sensor. When the focal power of the liquid lens was equal to 1/L, a truly flat sample was producing the sharpest image of the mode spectrum.

The system was configured to operate at 790 nm, with the prism having a cross-section of an equilateral triangle with exit angle of 60°, and also having refractive index at 790 nm of 1.71. The parameter cos (a) had a value of 0.465, the glass-specimen index was about $n_g=1.514$ at the measurement wavelength. The exit angle sensitivity to effective index P was at 2.133. The distance $l_1$ between the prism exit surface and the liquid lens was about 55 mm, and the total distance $l=l_1+l_2/n_p$ was about 58 mm. For each of the three groups of specimens, there were some specimens that were flat or nearly flat, and one specimen that had significant curvature in the measurement location, exceeding 1 m$^{-1}$. For the most curved specimen in each group, an auxiliary lens with focal length of 200 mm was inserted between the prism and the liquid lens, located a distance 13 mm from the liquid lens.

Figure 10A:
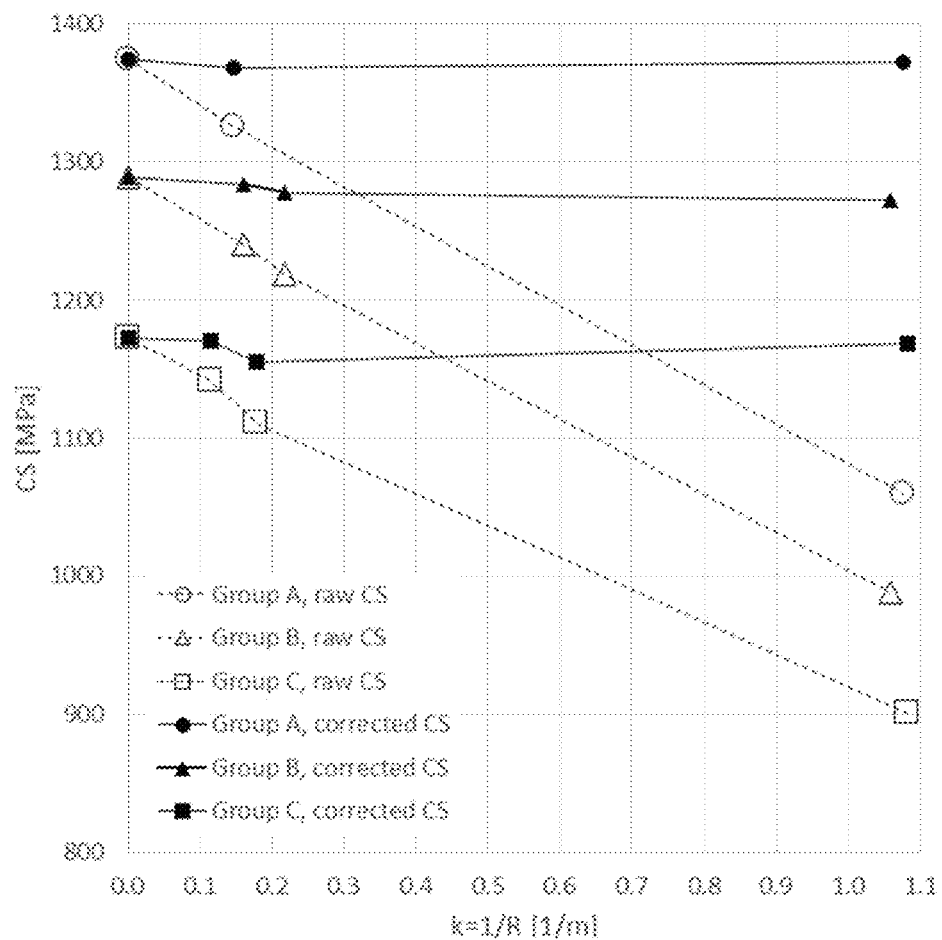
FIG. 10A is a plot of the compressive stress CS (MPa) versus the curvature $k=1/R$ ($m^{-1}$) where R is the local radius of curvature of the curved substrate at the measurement location, and showing three groups of measured specimens (Group A, B and C), where raw CS measurements are shown in hollow symbols and corrected measurements are shown in filled-in symbols.
Figure 10B:
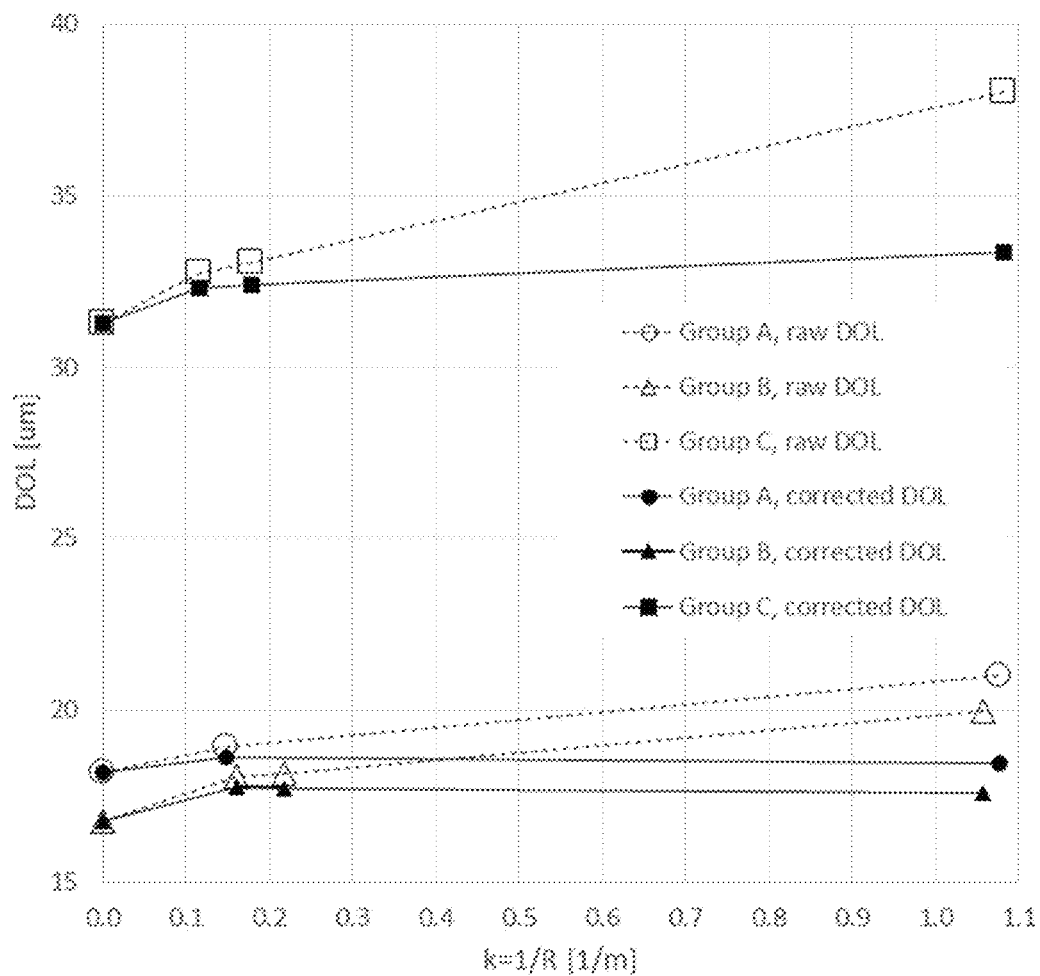
FIG. 10B is similar to FIG. 10A and plots the depth of layer DOL (microns, μm) versus $k=1/R$ ($m^{-1}$) for Groups A, B and C for raw and corrected measurements.

FIGS. 10A and 10B respectively plot measured values of CS (MPa) and DOL (μm) as a function of the substrate curvature 1/R (m$^{-1}$), where R is the local radius of curvature of the sample being measured. A liquid lens was used as the detector optical system 142 and its focal length was adjusted to produce the sharpest image of the mode spectrum.

The raw values of CS in FIG. 10A were obtained using three groups of samples and directly processing the sharpest image of each mode spectrum without dynamic correction of the calibration. The raw data for the three groups are shown with open symbols connected with dashed lines (circles for group A, triangles for group B, and squares for group C). Clearly there is a strong dependence of the raw CS and DOL values on the specimen curvature 1/R. Application of the dynamic correction with a value of system calibration parameter γ=1.66 produced substantially the same CS for all specimens within each group. The final CS values are shown by filled circles, triangles, and squares for groups A, B, and C, respectively, and connected with continuous lines.

FIG. 10B shows the raw DOL before applying dynamic calibration correction for the same sample groups as FIG. 10A as open symbols, and the corrected DOL after applying the dynamic calibration correction with filled symbols, for each of groups A, B, and C. In the calculation of the parameter Q described above, and the estimated radius of curvature R, the compound lens of the detector optical system 142 was treated as a simple single-element thin lens with a focal power equal to the sum of the focal powers of the auxiliary thin lens and the liquid lens, and the distance between the two lenses was ignored. The error in this assumption is absorbed by the calibration coefficient γ.

The final DOL values are shown by filled circles, triangles, and squares for groups A, B, and C, respectively, and connected with continuous lines. It is clear that the inventive method is effective in producing accurate values for both CS and DOL over the entire range of curvatures when the dynamic calibration routine is configured with the appropriate value of the system calibration parameter γ.

Accounting for Compound Lenses

As noted herein, the detector optical system 142 may comprise a compound lens having multiple lens elements. In one example, one of the elements is a variable lens, such as a liquid lens that has an adjustable focal length, and the others are regular lenses such as a spherical thin lens elements.

In some instances, the measured CS substrate 10 may have significant curvature by design, and there may be some uncertainty in the curvature due to forming process variability and IOX process variability. In some such cases it may be preferred that the detector optical system 142 comprise a compound lens where at least one fixed lens element is used to substantially compensate for the target curvature of the sample, and at least one variable focus lens element is used to dynamically adjust the overall optical power to obtain a sharp mode spectrum image.

In another embodiment, the detector optical system 142 comprises a compound lens, having two or more individual lenses, with at least one individual lens enabled to move axially toward or away from the digital detector 150. The axial position of the movable lens is adjusted to obtain the best focusing for each individual CS substrate to be measured. The axial shift of the individual lens changes the effective focal length f of the system, and may also change the effective distances L and $l_1$ depending on whether the movable lens is situated closest to the prism output surface 45 or closest to the detector surface 152. The signal SD needed for the application of the calibration correction includes the axial position of the movable lens or change thereof. As in the previous embodiment, such axially movable individual lens can be combined with axially movable digital detector 150 to increase the system ability to cover a larger range of curvature of the measured CS substrate, in which case the signal SD may comprise signals related to the axial positions of both the movable lens and the digital detector 150 or the detector surface 152.

The same set of measurements of FIGS. 10A and 10B were used to test another embodiment of the method where a compound lens configuration is used in the detector optical system 142. In this case, optical power of the compound lens can be corrected for the distance between the auxiliary lens and the variable-f liquid lens, by using a known equation for the effective focal length of a compound lens:

$$BFL = \frac{f_1 - d}{f_1 + f_2 - d} \times f_2$$

where BFL indicates "back focal length", e.g., the focal length of the lens measured from the second lens in the sequence, d is the distance between the two lenses, and $f_1$ and $f_2$ are their individual focal lengths. In a similar but slightly different embodiment, simply the inverse focal power of the compound lens can be used, instead of the back focal length, the inverse focal power being defined as $$f = \frac{f_1}{f_1 + f_2 - d} \times f_2$$

In this embodiment, the BFL was used as the dynamic value of f in the formula for Q, which as noted above can be expressed as:

$$Q = \frac{\left(l_1 + \frac{l_2}{n_p}\right)}{\gamma f L}(L-f) \equiv \frac{l(L-f)}{\gamma f L} \equiv \frac{2l}{\gamma R}\frac{n_p}{\cos\alpha}$$

In addition, the distance l was reduced to approximately account for the insertion of the auxiliary lens. The distance l was reduced by half of the distance d=13 mm between the two lenses, to approximately correct for the reduction in the prism-compound lens distance.

The use of the more accurate estimates of the focal power of the compound lens and the correction for the prism-lens distance can provide a better estimate of the curvature of the most curved specimens, such as for example when the curvature is slightly higher than 1.2 m$^{-1}$ instead of slightly lower than 1.1 m$^{-1}$. In experimental measurements and data processing, this approach resulted in a lower value of 1.52 for system calibration coefficient $\gamma$ to reproduce substantially the same corrected values of CS and DOL as shown in FIGS. 10A and 10B.

The potential for improvement of accuracy by using the more accurate representation of the action of the compound lens may be realized after more extensive studies using sets of specimens specifically designed to enable higher precision of evaluation than the specimens used for obtaining the data of FIGS. 10A and 10B.

Accounting for Index Matching Fluid

In the examples provided so far, the index oil (fluid) interfacing the measured specimen and the prism at the measurement interface INT was selected to have substantially the same refractive index as the coupling prism index $n_p$ at the measurement wavelength. In another example, the disclosed method utilizing dynamic calibration correction was successfully applied when the interfacing oil had refractive index substantially lower than the prism index $n_p$, and substantially higher than the measured specimen.

In particular, at a measurement wavelength of about 790 nm, the prism refractive index $n_p$ was about 1.71, the oil refractive index was about 1.63, and the glass specimen refractive index $n_g$ was about 1.514. A set of curved specimens was first measured on the system described in the previous embodiment using dynamic calibration, with interfacing oil having substantially the same index as the prism. The specimens had a variety of CS and DOL values. Then the specimens were measured on a similar system, but with the interfacing oil of intermediate refractive index of about 1.63. The correct values of CS and DOL were recovered for the full set of specimens, when a somewhat different value of the system-calibration parameter $\gamma$ was used.

Since the inventive method uses the parameter $\gamma$ to calibrate each system 100, it is clear that the oil with intermediate index can be treated as a property of the system, and its effect incorporated in the value of the system-specific calibration parameter $\gamma$.

In another embodiment, a sample holder is designed to place the CS substrate 10 such that the preferred measurement location on the coupling prism 42 is contacted with the preferred measurement location on the top (measurement) surface 12 of the CS substrate to enable faster and easier achieving a sharp mode spectrum image with the help of the dynamic focusing feature of the system 100.

Lens Array Embodiment

In another embodiment, the detector optical system 142 can comprise a number of discrete lenses with different focal lengths that can be inserted into the optical path of the reflected light beam 116R. FIG. 3B shows an example configuration of the detector optical system 142 that comprises a lens support structure 170 that is movable and supports an array or a discrete set of focusing lenses 172 each having a different focal length. In one example, the lens support structure 170 is in the form of a wheel having a central wheel axis AW about which the wheel can rotate (and may be actuated for example by a drive motor that replaces the translation device 156), to place into the reflected light beam 116R a select one of the focusing lenses 172 that forms a sharp mode spectrum 160 image. The optical power (1/f) of the focusing lens 172 employed is then used to calculate the proper calibration according to the calibration set forth above. In this case, the signal SD providing the required focal length (or optical power) includes the information about which focusing lens 172 or which wheel position resulted in the sharpest mode spectrum 160 image.

In another similar embodiment shown in FIG. 3C, the lens support structure 170 is movable and can support the set of focusing lenses 172 in a linear or p×q array instead of a wheel. FIG. 3C shows by way of example a 1×5 lens array. In an example, the set of focusing lens 172 is used in such a way that the active focusing lens of the set during the measurement is located sufficiently close to the coupling prism 42 to satisfy a preferred ratio l/L≤ε (or a preferred ratio l/R) as described above for the first variable focus embodiment. The calibration correction methods set forth above may be applied to improve the accuracy of the stress measurement result whether the compound active lens is placed close to the sample or not.

Another embodiment, the detector optical system 142 comprises one or more discrete arrays of lenses, such as the arrays of FIG. 3B and FIG. 3C, with each lens within an array having a fixed focal length. In this embodiment a lens with continuously variable focal length f is not required. Also not required is the ability to change the distance L between the focusing element and the detector surface 152 of the digital detector 150. The discrete set of lenses covers a range of net focal powers adequate to serve the range of curvatures that CS specimens have in the measurement locations of interest.

For each specimen, either the sharpest image of the coupling spectrum or an image of said coupling spectrum with adequate sharpness is chosen among all the possible images of the spectrum that can be captured by the sensor by using one of the available lenses or a one of the available combinations of lenses (if two or more arrays are used in sequence along the optic axis). The configuration of lenses (e.g., focal length, or lens identification number, or configuration identification number) is comprised in the feedback signal SD used to produce the calibration correction.

In one example the feedback signal is omitted by positioning of the active lens close enough to the prism to adequately reduce the calibration error, as disclosed in the description of other embodiments above. In another example, with or without the use of feedback signal and calibration correction, the array of discrete lenses may be combined with a quasi-continuously movable lens, a lens with quasi-continuously adjustable focal length (such as liquid lens), or a detector surface 152 that is quasi-continuously movable along the optic axis, to refine the image sharpness, as can be inferred by considering other embodiments in the present disclosure. Maximizing the image sharpness helps not only with providing the signal SD for the most accurate calibration correction, but also helps maximize the precision of the measurement of the positions of the spectral features of interest, and thus the precision of measurement of characteristics of the index or stress profile of the CS sample.

In another embodiment, the detector optical system 142 has a fixed focal length, and is axially moved between the prism output surface 45 and the digital detector 150 to form a sharp mode spectrum image, adapting to the curvature of the CS substrate at the measurement location. In this case, axially moving the detector optical system 142 does not change f per se, but changes both L and $l_1$ in the calibration-correction formula, hence the feedback signal SD from the translation device 156 is used to produce the correct values of both L and $l_1$ for calculating the calibration.

In another embodiment, the detector optical system 142 has a fixed focal length, and both the detector optical system 142 and the digital detector 150 are axially moved (preferably in opposite directions) to form a sharp mode spectrum image, adapting to the curvature of the CS substrate at the measurement location. In this case the feedback signal SD from the translation device 156 is used to produce the correct value of both and for calculating the calibration.

Measured Mode Spectra

FIG. 11 is a photograph of a mode spectrum 160 image for a flat part. The TM and TE mode lines 163TM and 163TE are very sharp, indicating an in-focus image.

FIGS. 12A through 12C are photographs of mode spectrum 160 images for curved CS substrates 10 with radii of curvature R of 10 m, 6 m and 4.3 m, respectively and without any focus adjustment of the detector optical system 142. It can be seen that the smaller the radius of curvature (and thus the greater the curvature 1/R), the greater the reduction in fringe contrast.

FIGS. 13A and 13B are photographs of mode spectrum 160 images for the R=10 m and R=6 m CS substrates 10 but with the position of the detector optical system 142 shifted by +3.5 mm, i.e., 3.5 mm farther from the digital detector 150. The mode spectrum 160 image of FIG. 13A is now in-focus and very sharp, much sharper than the original-focus counterpart of FIG. 12A. The spectrum for R=6 m in FIG. 13B is not quite in-focus, but has improved sharpness and contrast compared its original-focus counterpart of FIG. 12B.

FIGS. 14A and 14B are photographs of mode spectrum 160 images for the R=6 m and R=4.3 m CS substrates 10 but with the position of the detector optical system 142 shifted by +5.8 mm (e.g., the distance L between the detector optical system 142 and the sensor plane of the digital detector is increased by 5.8 mm). The mode spectrum 160 image of FIG. 14A is now in-focus and very sharp, much sharper than its original-focus counterpart of FIG. 12B. The mode-spectrum image of FIG. 14B has improved sharpness and contrast relative to its original-focus counterpart of FIG. 13B.

Figure 15:
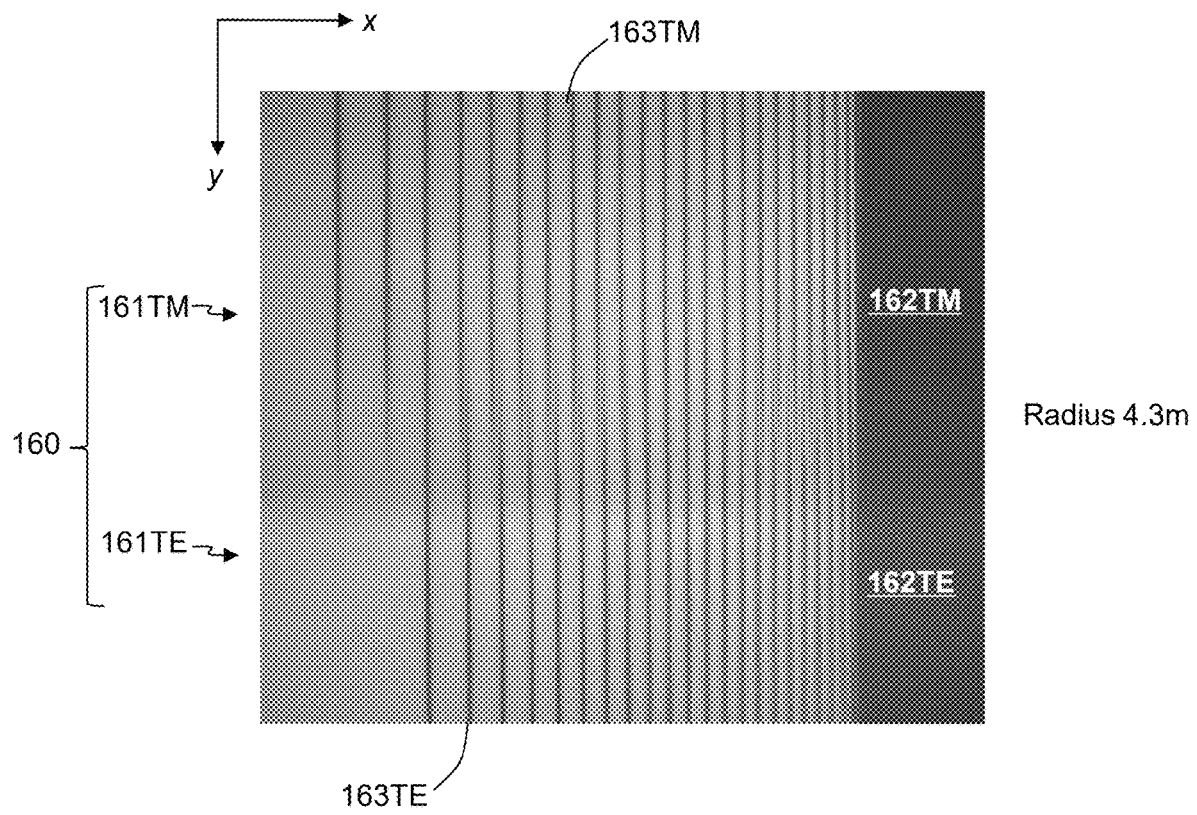
FIG. 15 is an actual mode spectrum image for the CS substrate with R=4.3 m but with the focus adjusted by shifting the image-forming lens away from the camera by +8.1 mm, relative to the first-focus lens position, to bring the image into best focus.

FIG. 15 is a photograph of the mode spectrum 160 image for the R=4.3 m substrate 10 but with the position of the detector optical system 142 shifted by +8.1 mm such that the distance L is now 8.1 mm larger than its original value. The mode spectrum 160 image of FIG. 15 is much sharper than that shown in FIG. 14B and appears to indicate a best focus position for the detector optical system for the R=4.3 m CS substrate 10.

Figure 16:
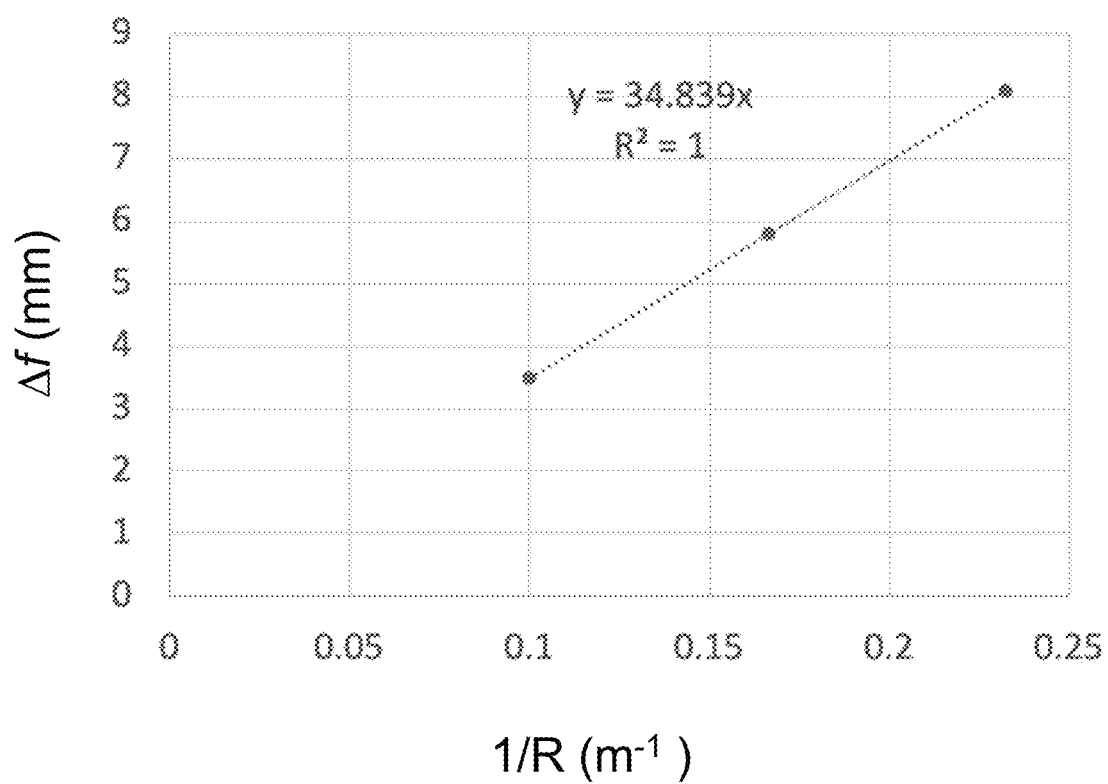
FIG. 16 is a plot of the change in focus Δf (mm) vs the curvature 1/R ($m^{-1}$) and showing a linear relationship between the change in focus to obtain a sharp (maximum contrast) mode spectrum image and the local curvature of the CS substrate being measured.

FIG. 16 is a plot of the focus shift Δf (mm) versus the curvature 1/R (m-1) of the three CS substrates of FIGS. 11 through 15 having R of 10 m, 6 m and 4.3 m. The plot shows a linear relationship between the focus shift Δf (mm) and the curvature for the given range of R.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of obtaining a corrected digital mode spectrum for a chemically strengthened (CS) substrate having a curved surface and a near-surface waveguide adjacent the curved surface, comprising:
   optically coupling a measurement light beam into and out of the near-surface waveguide using a coupling prism, the coupling prism interfaced with the curved surface of the CS substrate to define a coupling interface;
   transmitting the measurement light beam coupled out of the near-surface waveguide through the coupling prism along an axis through a detector optical system to a digital detector;
   digitally capturing transverse magnetic (TM) and transverse electric (TE) mode spectra of the CS substrate with the digital detector, the evanescent prism coupling system having a system calibration for measuring flat CS substrates, wherein the TM and TE mode spectra comprise respective TM and TE mode lines having a variable spacing Δx and a corresponding effective index difference $\Delta n_{eff}$ wherein $\Delta x \propto \Delta n_{eff}$ for the system calibration;
   establishing a calibration correction representative of a difference in the digitally captured TM and TE mode spectra as compared to a reference TM and TE mode spectra for a reference CS substrate;
   applying the calibration correction to the digital mode spectrum image to form the corrected digital mode spectrum that can be processed using the system calibration for measuring flat CS substrates; and
   processing the corrected digital mode spectrum using the system calibration to determine at least one of:
   a) a refractive index profile of the CS substrate; or
   b) one or more stress-related characteristics of the curved CS substrate being measured.

2. The method according to claim 1, wherein the TM and TE mode spectra respectively include TM and TE mode lines and mode-line spacings, the reference TM and TE mode spectra respectively include the reference TM and TE mode lines and reference mode-line spacings, and wherein the establishing of the calibration correction comprises establishing a relationship between the mode-line spacings of the digital mode spectrum image to the reference mode-line spacings of the reference CS substrate.

3. The method according to claim 1, wherein the system calibration includes a focus and further comprising forming the digital mode spectrum image by changing the focus so that the digital mode spectrum image has either a maximum contrast or a maximum sharpness.

4. The method according to claim 1, wherein the detector optical system has an adjustable focus, and further comprising forming at the digital detector a focused digital mode spectrum image having either a maximum contrast or a maximum sharpness.

5. The method according to claim 4, wherein the detector optical system arranged between the coupling prism and the digital detector along the axis to define a first axial distance l between the detector optical system and the coupling interface and a second axial distance L between the detector optical system and the digital detector, and wherein a length ratio l/L<ε, wherein ε is a tolerance value and is in the range from 0.2 to 0.01.

6. The method according to claim 1, where $n_p$ is a refractive index of a coupling prism of the evanescent prism coupling system, l is a first axial distance between the detector optical system and a coupling interface of the coupling prism and the CS substrate, L is a second axial distance between the detector optical system and the digital detector that digitally captures the TM and TE mode spectra, $K_f$ is a system calibration parameter for the system calibration for the reference CS substrate and wherein the dynamic calibration parameter $K_d$ is calculated as:

$$K_d = \frac{PQ}{n_p}\sqrt{n_p^2 = n_{eff}^2}$$

where P is given by $P=[K_f L]^{-1}$; and
where Q is given by $$Q = \frac{2l\, n_p}{\gamma R \cos\alpha}$$

where γ is a system calibration parameter for measuring curved CS substrates having a local radius of curvature R at the coupling interface and α comprises an incidence angle of the measurement light beam incident the coupling prism for the corresponding TE and TM mode lines.

7. The method of claim 1, further comprising:
passing the measurement light beam through a gap defined between adjacent light-blocking members that are spaced apart before the measurement light beam is coupled into the near-surface waveguide.

8. The method of claim 1, wherein the at least stress-related characteristic comprises a surface compressive stress, a knee stress, a depth of layer, or combinations thereof.

9. A method of determining at least one of a refractive index profile and at least one stress-related characteristic of a curved chemically strengthened (CS) substrate using an evanescent prism coupling system having an adjustable focus, comprising:
 a) calibrating the evanescent prism coupling system by adjusting the adjustable focus to a first focus that forms an in-focus calibration mode spectrum image of a reference CS substrate to establish a calibrated system for measuring the reference CS substrate;
 b) using the calibrated system, forming an in-focus mode spectrum image for the curved CS substrate by adjusting the adjustable focus to a second focus due to a focus shift caused by using the curved CS substrate in the calibrated system for measuring a flat CS substrate, wherein using the calibrated system further comprises:
  optically coupling measurement light beam into and out of the curved CS substrate using a coupling prism, the coupling prism interfaced with a curved surface of the CS substrate to define a coupling interface; and
  transmitting the measurement through the coupling prism along an axis through a detector optical system having the second focus to a digital detector where the in-focus mode spectrum image is formed;
 c) determining a raw value of at least one stress-related characteristic of the curved CS substrate based on the in-focus mode spectrum image for the curved CS substrate using a corresponding at least one calculation for the at least one stress-related characteristic for the flat CS substrate; and
 d) adjusting the raw value of the at least one stress-related characteristic to obtain a corrected value by multiplying the raw value by a correction factor based on a change in the adjustable focus from the first focus for the flat CS substrate to the second focus for the curved CS substrate.

10. The method according to claim 9, wherein the change in the adjustable focus from the first focus to the second focus comprises changing an axial distance between the detector optical system and the digital detector.

11. The method according to claim 9, wherein the detector optical system has an amount of optical power and wherein changing the adjustable focus from the first focus to the second focus comprises changing the amount of optical power of the detector optical system.

12. The method according to claim 11, wherein the detector optical system comprises a liquid lens having a surface and wherein changing the amount of optical power comprises changing an amount of curvature of the surface of the liquid lens.

13. The method according to claim 11, wherein the correction factor comprises a dynamic correction factor $K_d$ such that:

$$K_d = \frac{K_f}{1 - \frac{1}{L_f K_f}\cos\alpha\left(l_1 + \frac{l_2}{n_p}\right)\frac{(L-f)}{\gamma f L}},$$

wherein:
$K_f$=calibration factor for the calibrated $$\text{system} = \frac{1}{f\dfrac{d\beta_e}{dn_{eff}}}$$

where f is a system focus and $$\frac{d\beta_e}{dn_{eff}}$$

is the change in a ray angle $\beta_e$ an effective index $n_{eff}$ for a light beam that forms the in-focus mode spectrum image for the flat CS substrate;
$L_f$=axial distance from the detector optical system to a digital detector;

$$\cos\alpha = \frac{1}{n_p}\sqrt{n_p^2 - n_{eff}^2},$$

where $n_p$ is a refractive index of a coupling prism used to couple the measurement light beam into and out of the curved CS substrate;
$l_1$ is a first axial distance between the detector optical system and an output surface of the coupling prism; and $l_2$ is a second axial distance from the output surface of an interface between a coupling surface of the coupling prism and a surface of the CS substrate.

14. The method according to claim 13, wherein the at least one stress-related characteristic comprises a surface compressive stress, the raw value comprises a surface compressive stress $CS^{(raw)}$ and wherein the corrected value of the surface compressive stress is given according to $$CS = \frac{K_d}{K_f} CS^{(raw)}.$$

15. The method according to claim 13, wherein the at least one stress-related characteristic comprises a knee stress CSk, the raw value comprises a raw knee stress $CSk^{(raw)}$ and wherein the corrected value of the knee stress is given according to $$CSk = \frac{K_d}{K_f} CSk^{(raw)}.$$

16. The method according to claim 13, wherein the at least one stress-related characteristic comprises a depth of layer DOL, the raw value comprises a raw depth of layer $DOL^{(raw)}$ and wherein the corrected value of the depth of layer is given by $$DOL = \sqrt{\frac{K_f}{K_d}} DOL^{(raw)}.$$

17. A method of determining at least one stress-related characteristic for a chemically strengthened (CS) substrate having a curved surface and an adjacent near-surface waveguide adjacent the curved surface, comprising:
optically coupling a measurement light beam into and out of the near-surface waveguide using a coupling prism, the coupling prism interfaced with the curved surface of the CS substrate to define a coupling interface;
transmitting the measurement light beam coupled out of the near-surface waveguide through the coupling prism along an axis through a detector optical system to a digital detector;
digitally capturing transverse magnetic (TM) and transverse electric (TE) mode spectra of the CS substrate using an evanescent prism coupling system to couple measurement light into and out of the near-surface waveguide through the coupling prism of the evanescent prism coupling system having a prism refractive index $n_p$ and defining coupling interface with the CS substrate to form a digital mode spectrum image with the digital detector, the evanescent prism coupling system having a system calibration comprising a system calibration parameter $K_f$ for measuring flat CS substrates, wherein the TM and TE mode spectra comprise respective TM and TE mode lines having a corresponding effective index difference $n_{eff}$, the digitally captured TM and TE mode spectra are measured with the evanescent prism coupling system having an incidence angle $\alpha$ of a measurement light beam incident the coupling prism, l is a first axial distance between a detector optical system;

establishing a calibration correction representative of a difference in the digitally captured TM and TE mode spectra as compared to a reference TM and TE mode spectra for a reference CS substrate, wherein the establishing of the calibration correction comprises calculating $\Delta n_{eff} = K_d \cdot \Delta x$ where $K_d$ comprises a dynamic calibration parameter for the curved CS substrate, the dynamic calibration parameter $K_d$ is calculated as:
where P is given by $P=[K_f L]^{-1}$ and Q is given by $$K_d = \frac{PQ}{n_p} \sqrt{n_p^2 - n_{eff}^2}$$

where P is given by $P=[K_f L]^{-1}$ and Q is given by $$Q = \frac{2l\, n_p}{\gamma R \cos\alpha},$$

where $\gamma$ is a system calibration parameter for measuring curved CS substrates having a local radius of curvature R at the coupling interface and; and
processing the digitally captured TM and TE mode spectrum using the dynamic calibration parameter to determine the at least one stress-related characteristic.

18. The method of claim 17, wherein the processing comprising adjusting a raw value of the at least one stress-related characteristic using the dynamic calibration parameter to determine a corrected value of the at least one stress-related characteristic.

19. The method of claim 18, wherein the at least one stress-related characteristic comprises:
a surface compressive stress where the corrected surface compressive stress $CS^{(corr)}$ is related to the raw value of the surface compressive stress $CS^{(corr)}$ as $$CS = \frac{K_d}{K_f} CS^{(raw)};$$

a knee stress CSk where the corrected knee stress $CSk^{(corr)}$ is related to the raw value of the surface compressive stress $CSk^{(raw)}$ as $$CSk^{(corr)} = \frac{K_d}{K_f} CSk^{(raw)};$$

a depth of layer DOL where the corrected value $DOL^{(corr)}$ is related to the raw value of the depth of layer $DOL^{(raw)}$ as $$DOL^{(corr)} = \sqrt{\frac{K_f}{K_d}} DOL^{(raw)};$$

or combinations thereof.

20. The method of claim 17, wherein SOC is a stress optic coefficient, and the at least one stress-related characteristic comprises:
a surface compressive stress CS(0) calculated as $CS(0) = K_d \cdot B_{surf}/SOC$ where $B_{surf}$ is a surface birefringence measured using an in-focus calibration mode spectrum image for the flat CS substrate;
a knee stress CSk calculated as $CSk = K_d \cdot B_{knee}/SOC$ where $B_{knee}$ is a knee stress birefringence as measured using an in-focus calibration mode spectrum image for the flat CS substrate; or combinations thereof.

* * * * *